(12) United States Patent
Marosi et al.

(10) Patent No.: US 9,847,636 B2
(45) Date of Patent: Dec. 19, 2017

(54) LOW VOLTAGE BUSS SYSTEM

(71) Applicant: IDEAL INDUSTRIES, INC., Sycamore, IL (US)

(72) Inventors: Jason Marosi, Sycamore, IL (US); Alan E. Zantout, Sycamore, IL (US); Benjamin D. Swedberg, Sycamore, IL (US)

(73) Assignee: IDEAL Industries, Inc., Sycamore, IL (US)

( * ) Notice: Subject to any disclaimer, the term of this patent is extended or adjusted under 35 U.S.C. 154(b) by 516 days.

(21) Appl. No.: 14/030,768

(22) Filed: Sep. 18, 2013

(65) Prior Publication Data

US 2014/0167501 A1   Jun. 19, 2014

Related U.S. Application Data

(60) Provisional application No. 61/725,795, filed on Nov. 13, 2012, provisional application No. 61/768,907, filed on Feb. 25, 2013, provisional application No. 61/744,777, filed on Oct. 3, 2012, provisional application No. 61/744,779, filed on Oct. 3, 2012.

(51) Int. Cl.
*H02J 1/00*     (2006.01)
*F21V 8/00*     (2006.01)
*G06F 1/20*     (2006.01)
*G06F 1/26*     (2006.01)

(52) U.S. Cl.
CPC .............. *H02J 1/00* (2013.01); *G02B 6/0055* (2013.01); *G02B 6/0073* (2013.01); *G02B 6/0083* (2013.01); *G06F 1/20* (2013.01); *G06F 1/266* (2013.01); *G02B 6/0091* (2013.01); *G02B 6/0095* (2013.01); *Y10T 307/25* (2015.04)

(58) Field of Classification Search
CPC ....... H01Q 9/0421; H01Q 21/29; F21V 21/00
See application file for complete search history.

(56) References Cited

U.S. PATENT DOCUMENTS

| | | |
|---|---|---|
| 1,697,449 A | 1/1929 | Anderson |
| 2,250,513 A | 7/1941 | Von Gehr |

(Continued)

FOREIGN PATENT DOCUMENTS

| | | | | |
|---|---|---|---|---|
| CA | 1103304 A1 * | 6/1981 | ............... | H05C 1/00 |
| DZ | WO 2012113409 A2 * | 8/2012 | ......... | H01R 13/7037 |

(Continued)

OTHER PUBLICATIONS

Ernest, et.al."led lighting assmebly and method of lighting for a merchandise display," Jun. 15, 2012, pp. 1-9, Fig. 1-19.*

(Continued)

*Primary Examiner* — Thienvu Tran
*Assistant Examiner* — Pinping Sun
(74) *Attorney, Agent, or Firm* — Greenberg Traurig, LLP

(57) ABSTRACT

An example low voltage buss system is provided. The low voltage bus system distributes low voltage DC power into the office workspace in a manner that reduces clutter and promotes customizable and efficient workspace usage. The low voltage bus system distributes low voltage DC power into the office workspace via an electrical buss having a connector at the end of the buss to distribute low voltage DC power to and throughout office workspace and, in particular, office furniture.

3 Claims, 33 Drawing Sheets

(56) References Cited

U.S. PATENT DOCUMENTS

| | | |
|---|---|---|
| 2,261,986 A | 11/1941 | Frank et al. |
| 2,360,420 A | 10/1944 | Hill |
| 2,924,804 A | 2/1960 | Frank et al. |
| 3,125,628 A * | 3/1964 | Fisher .................. H02G 5/06 |
| | | 174/16.2 |
| 3,295,093 A | 12/1966 | Neumann et al. |
| 4,300,185 A | 11/1981 | Wakamatsu |
| 4,468,547 A | 8/1984 | Belttary |
| 4,655,520 A | 4/1987 | Cummings |
| 4,768,964 A | 9/1988 | Zucchini |
| 4,812,134 A * | 3/1989 | Miller .................. H01R 25/14 |
| | | 439/110 |
| 4,874,322 A | 10/1989 | Dola et al. |
| 4,947,302 A | 8/1990 | Callahan |
| 4,951,029 A | 8/1990 | Severson |
| 4,981,438 A | 1/1991 | Bekhiet |
| 5,110,300 A | 5/1992 | Woodgate |
| 5,152,698 A | 10/1992 | Juhlin et al. |
| 5,155,955 A | 10/1992 | Ball et al. |
| 5,157,273 A | 10/1992 | Medendorp et al. |
| 5,160,188 A | 11/1992 | Rorke et al. |
| 5,164,609 A | 11/1992 | Poppe et al. |
| 5,226,705 A | 7/1993 | Rorke et al. |
| 5,244,401 A | 9/1993 | Russell et al. |
| 5,252,086 A | 10/1993 | Russell et al. |
| 5,258,899 A | 11/1993 | Chen |
| 5,277,609 A | 1/1994 | Ondrejka |
| 5,299,947 A | 4/1994 | Barnard |
| 5,336,849 A | 8/1994 | Whitney |
| 5,340,322 A | 8/1994 | Poulsen |
| 5,603,621 A | 2/1997 | Elmouchi |
| 5,606,919 A | 3/1997 | Fox et al. |
| 5,607,317 A | 3/1997 | King et al. |
| 5,646,594 A | 7/1997 | Barben, Jr. et al. |
| 5,655,822 A * | 8/1997 | Roberts .............. A47B 21/007 |
| | | 108/50.01 |
| 5,684,469 A | 11/1997 | Toms et al. |
| 5,788,517 A | 8/1998 | Elmouchi |
| 5,907,285 A | 5/1999 | Toms et al. |
| 5,939,862 A | 8/1999 | Kates et al. |
| 5,942,984 A | 8/1999 | Toms et al. |
| 6,046,513 A | 4/2000 | Jouper et al. |
| 6,078,113 A | 6/2000 | True et al. |
| 6,123,562 A | 9/2000 | King et al. |
| 6,133,845 A | 10/2000 | Toms et al. |
| 6,166,496 A | 12/2000 | Lys et al. |
| 6,168,282 B1 | 1/2001 | Chien |
| 6,211,796 B1 | 4/2001 | Toms et al. |
| 6,231,205 B1 | 5/2001 | Slesinger et al. |
| 6,250,931 B1 * | 6/2001 | Mendelson ........ H01R 13/6205 |
| | | 439/38 |
| 6,313,549 B1 | 11/2001 | Moisan et al. |
| 6,346,012 B1 * | 2/2002 | Cheng .................. G06F 1/26 |
| | | 439/632 |
| 6,424,248 B1 | 7/2002 | Toms et al. |
| 6,527,406 B1 | 3/2003 | Slesinger et al. |
| 6,585,529 B2 | 7/2003 | Zakerzewski |
| 6,634,895 B2 | 10/2003 | Agro |
| 6,830,468 B2 | 12/2004 | Schaerer et al. |
| 6,935,763 B2 | 8/2005 | Mueller et al. |
| 6,948,676 B1 * | 9/2005 | Tremblay .............. H01F 41/08 |
| | | 242/434.5 |
| 7,311,526 B2 * | 12/2007 | Rohrbach .......... H01R 13/6205 |
| | | 439/218 |
| 7,320,610 B2 | 1/2008 | Boike |
| 7,351,075 B1 | 4/2008 | Patterson et al. |
| 7,374,444 B1 | 5/2008 | Bennett |
| 7,455,535 B2 | 11/2008 | Insalaco et al. |
| 7,648,379 B2 | 1/2010 | Johnson et al. |
| 7,654,834 B1 | 2/2010 | Mier-Langner et al. |
| 7,697,268 B2 | 4/2010 | Johnson et al. |
| 7,726,974 B2 * | 6/2010 | Shah .................. H05B 33/0803 |
| | | 439/40 |
| 7,762,821 B2 | 7/2010 | Patterson et al. |
| 7,841,878 B2 | 11/2010 | Johnson et al. |
| 7,893,567 B1 | 2/2011 | Deros et al. |
| 7,955,106 B1 | 6/2011 | Crow et al. |
| 7,993,150 B1 | 8/2011 | Crow et al. |
| 7,997,910 B2 | 8/2011 | Myers et al. |
| 8,016,457 B2 | 9/2011 | Clark et al. |
| 8,061,864 B2 | 11/2011 | Metcalf et al. |
| 8,106,541 B1 | 1/2012 | Sarullo |
| 8,147,257 B2 | 4/2012 | Bury et al. |
| 8,172,588 B2 | 5/2012 | Johnson et al. |
| 8,172,589 B2 | 5/2012 | Johnson et al. |
| 8,184,445 B2 * | 5/2012 | Jacobs .................. F21V 21/096 |
| | | 361/601 |
| 8,262,244 B2 | 9/2012 | Metcalf et al. |
| 8,314,336 B2 | 11/2012 | Liang et al. |
| 8,651,711 B2 * | 2/2014 | Rudisill .................. F21V 29/70 |
| | | 362/249.02 |
| 8,985,813 B2 | 3/2015 | Zaderej et al. |
| 2001/0024894 A1 * | 9/2001 | Mosebach .......... B64D 11/0015 |
| | | 439/137 |
| 2003/0171017 A1 | 9/2003 | Schaerer et al. |
| 2004/0026998 A1 | 2/2004 | Henriott et al. |
| 2004/0154233 A1 | 8/2004 | Hodges et al. |
| 2005/0079769 A1 * | 4/2005 | Strayer ................ H01R 25/006 |
| | | 439/652 |
| 2005/0250389 A1 | 11/2005 | Johansen et al. |
| 2007/0279895 A1 | 12/2007 | Clark et al. |
| 2009/0042428 A1 * | 2/2009 | Henriott .................. A47B 21/06 |
| | | 439/215 |
| 2009/0052122 A1 | 2/2009 | Johnson et al. |
| 2009/0086478 A1 * | 4/2009 | Sanroma .................. A47F 3/001 |
| | | 362/234 |
| 2009/0152944 A1 | 6/2009 | Baine et al. |
| 2009/0278494 A1 | 11/2009 | Randall |
| 2009/0279298 A1 * | 11/2009 | Mier-Langner ........ F21V 21/096 |
| | | 362/235 |
| 2009/0293773 A1 * | 12/2009 | Miller ...................... A47B 21/00 |
| | | 108/28 |
| 2010/0008072 A1 | 1/2010 | Meier-Graichen et al. |
| 2010/0214747 A1 * | 8/2010 | Jacobs .................. F21V 21/096 |
| | | 361/729 |
| 2011/0076876 A1 * | 3/2011 | Fleisig .................. H01R 13/72 |
| | | 439/488 |
| 2011/0084627 A1 | 4/2011 | Sloan et al. |
| 2011/0159706 A1 * | 6/2011 | Wu ...................... H01R 13/6205 |
| | | 439/39 |
| 2012/0002356 A1 | 1/2012 | Linnane et al. |
| 2012/0068621 A1 * | 3/2012 | Ward ...................... F21V 21/096 |
| | | 315/294 |
| 2012/0208378 A1 | 8/2012 | Rudisill et al. |
| 2012/0223654 A1 * | 9/2012 | Van Hoof .......... H05B 33/0845 |
| | | 315/278 |
| 2012/0224373 A1 * | 9/2012 | Snijder .................. F21S 2/005 |
| | | 362/249.01 |
| 2012/0295451 A1 | 11/2012 | Hyun-Jun et al. |
| 2013/0294081 A1 | 11/2013 | O'Connor et al. |
| 2013/0335983 A1 | 12/2013 | Nicieja et al. |
| 2013/0337668 A1 * | 12/2013 | Ernest .................. H01R 25/147 |
| | | 439/110 |
| 2014/0167501 A1 | 6/2014 | Marosi et al. |
| 2014/0293544 A1 | 10/2014 | Zaderej et al. |

FOREIGN PATENT DOCUMENTS

| | | |
|---|---|---|
| EP | 0200473 | 11/1986 |
| EP | 0725992 | 8/1998 |
| EP | 0746950 | 7/2002 |
| JP | 2005094843 | 4/2005 |
| WO | 9319506 | 9/1993 |

OTHER PUBLICATIONS

International Search Report and Written Opinion issued on PCT/US2013/061933, dated Apr. 30, 2014, 11 pgs.

ISA/US, International Search Report and Written Opinion issued on PCT application No. US16/052095, dated Jan. 30, 2017, 12 pages.

(56) References Cited

OTHER PUBLICATIONS

European Patent Office, extended European Search Report issued on EP patent application No. 13844326.2, dated Aug. 19, 2016, 13 pages.

* cited by examiner

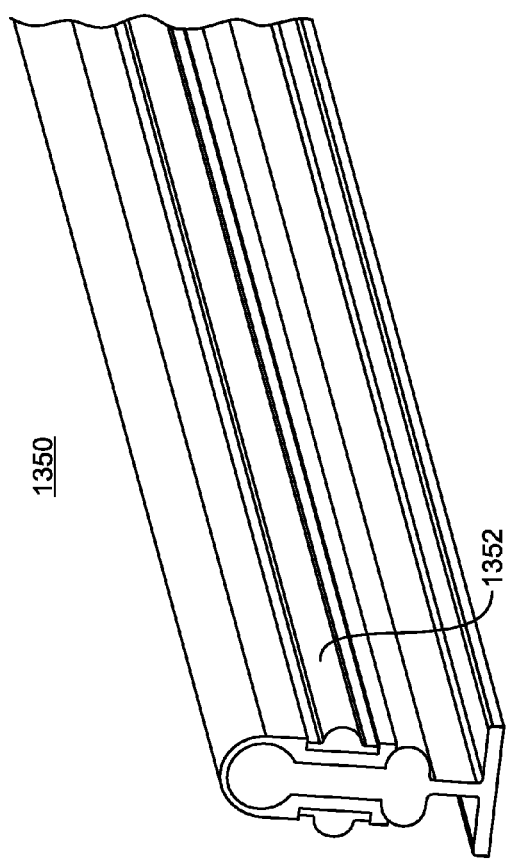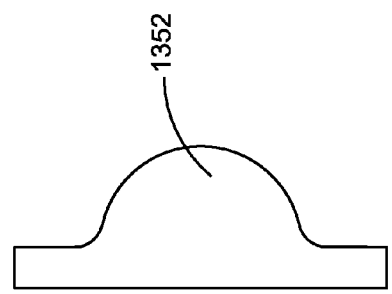
FIG. 20

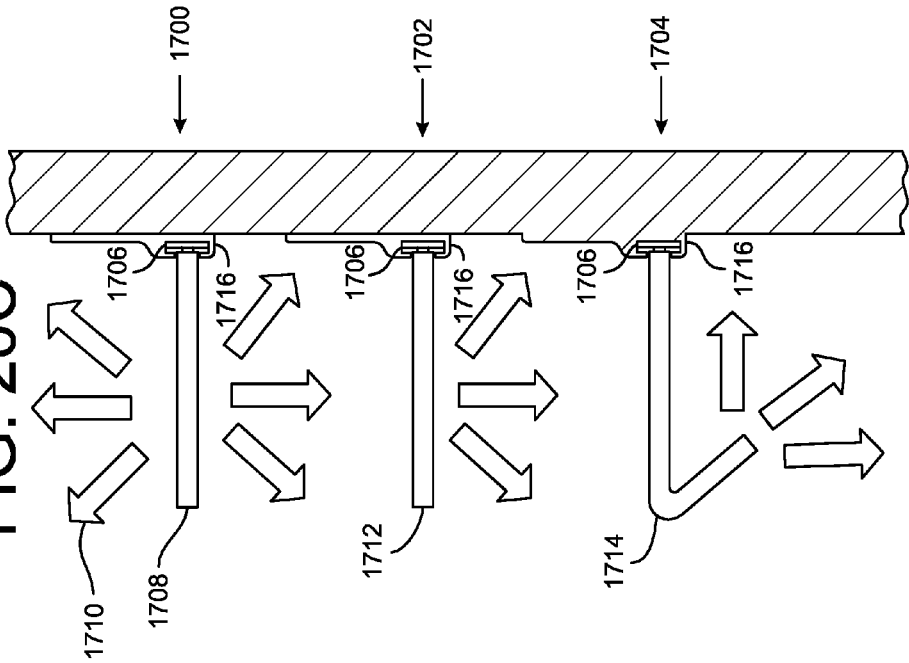
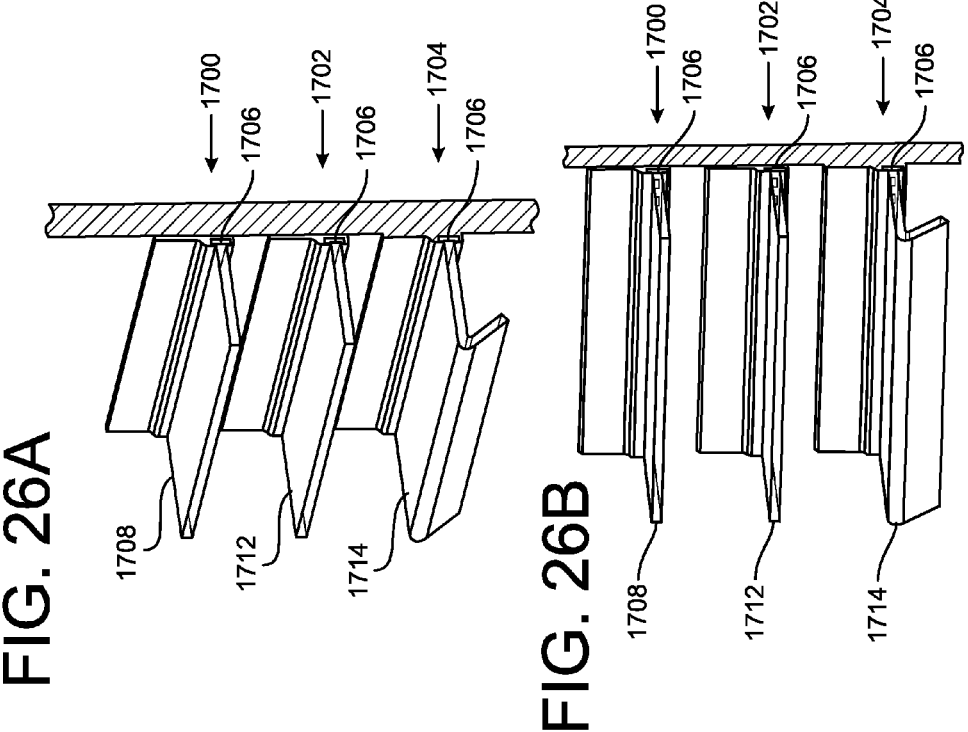

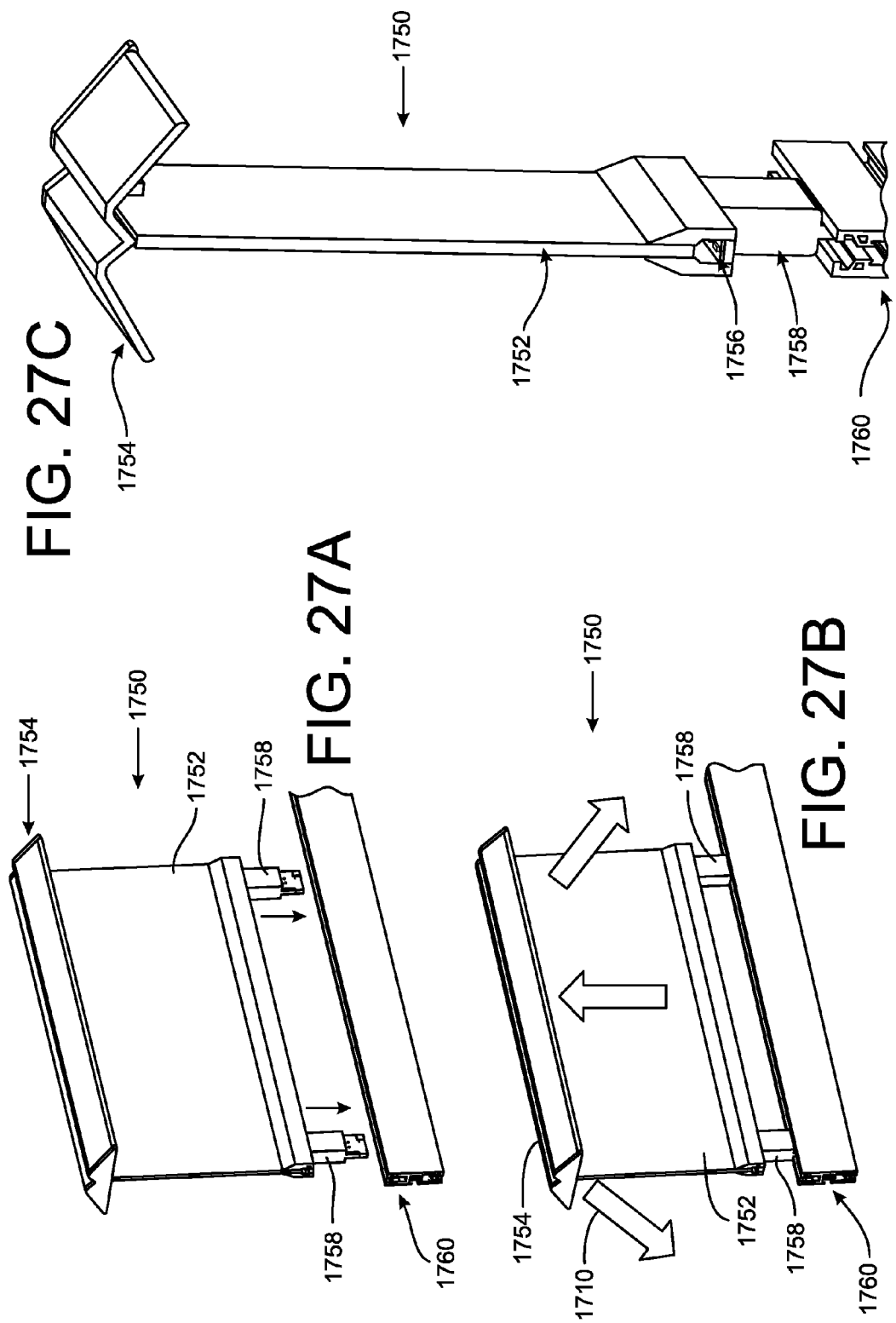

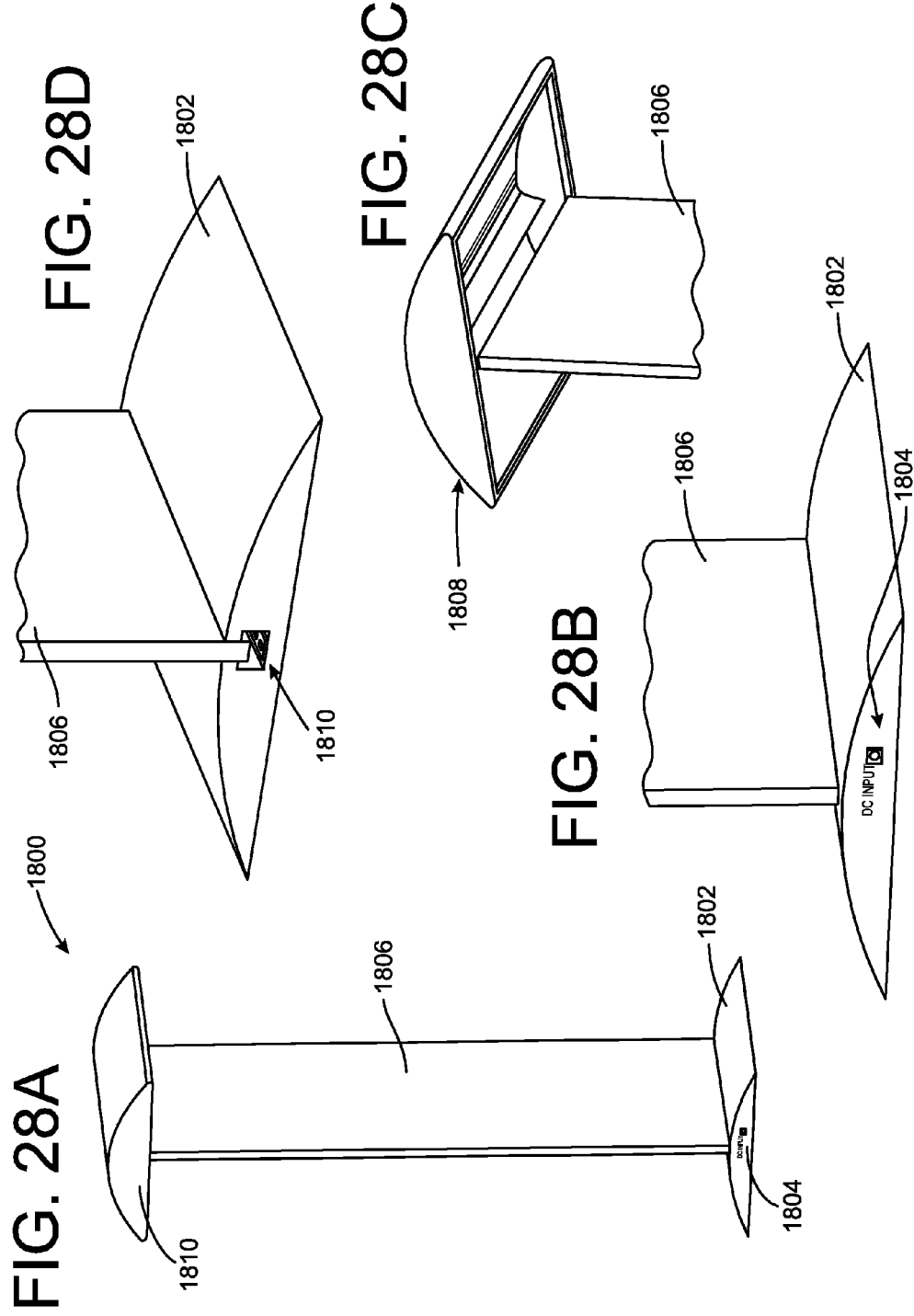

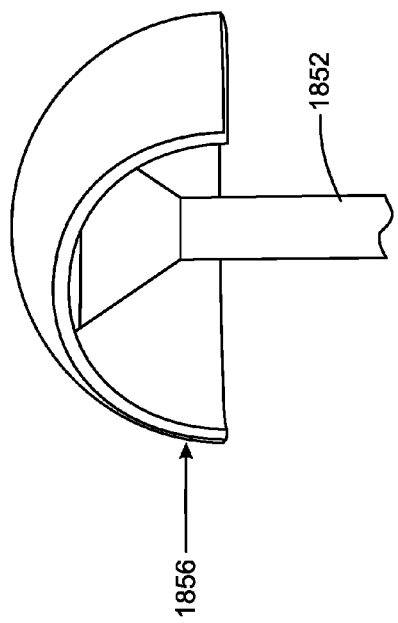
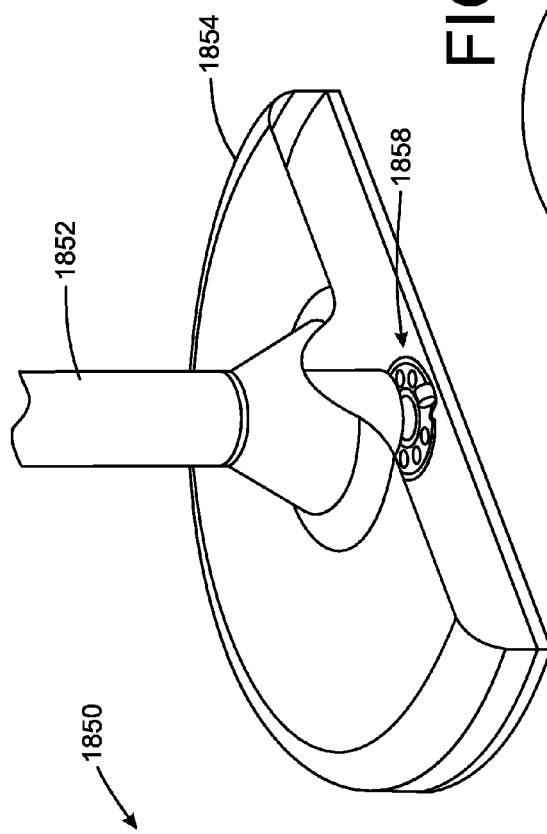
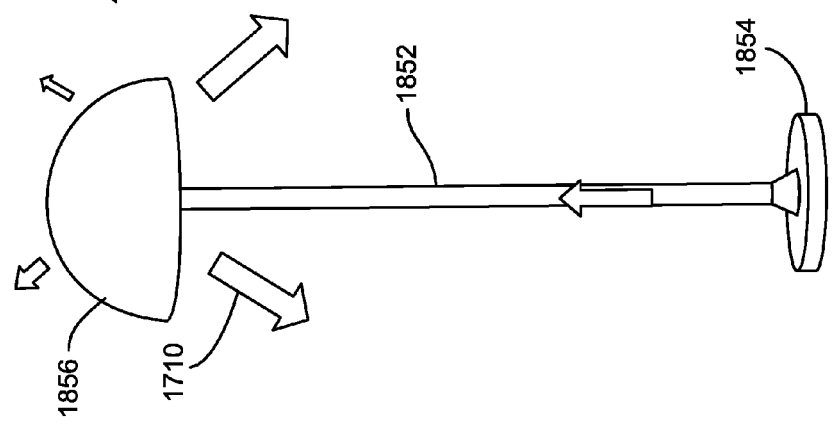

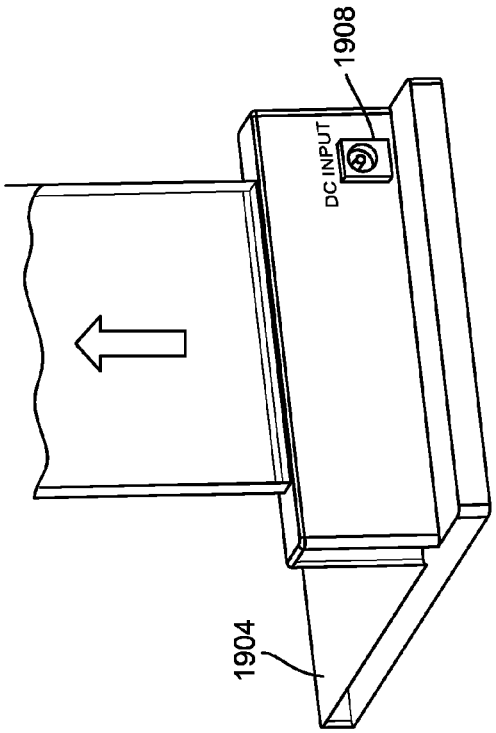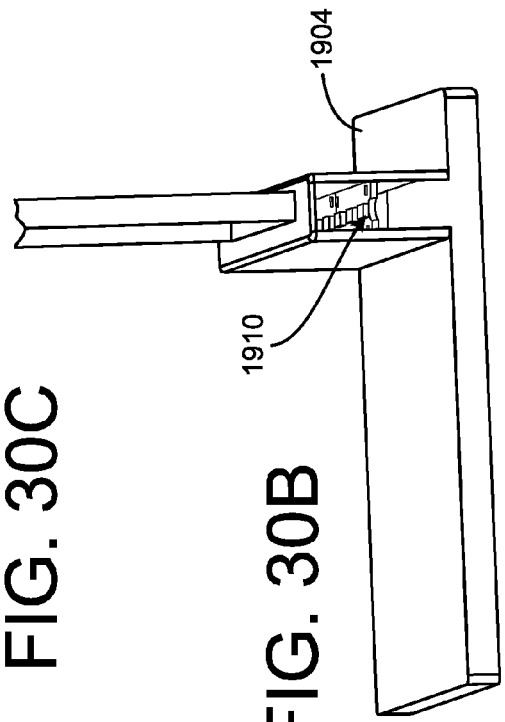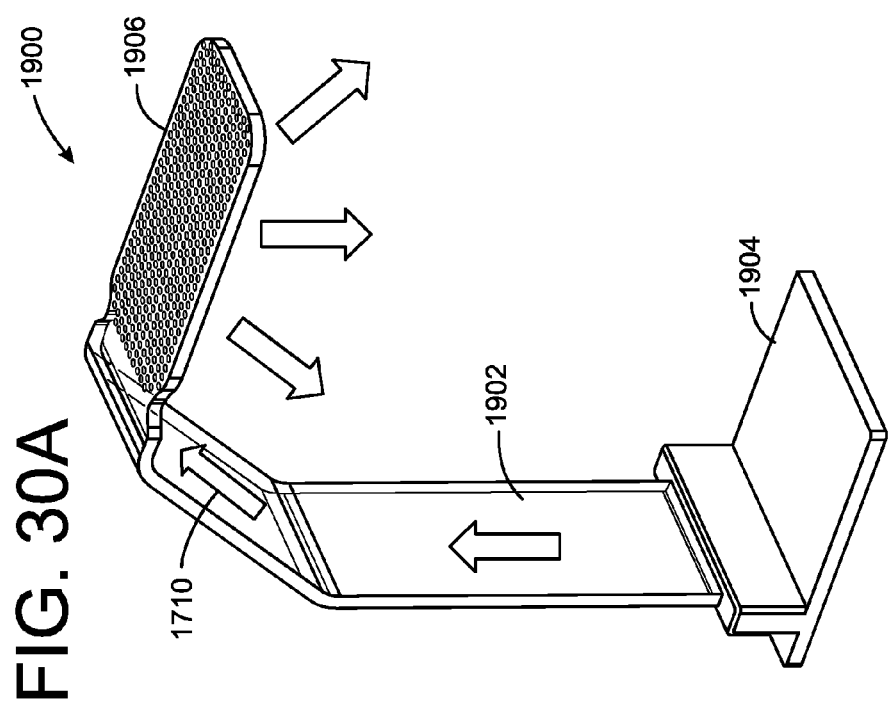

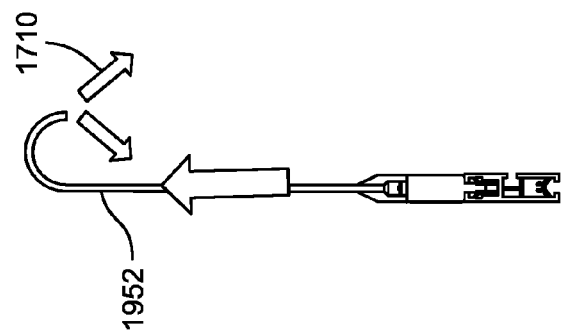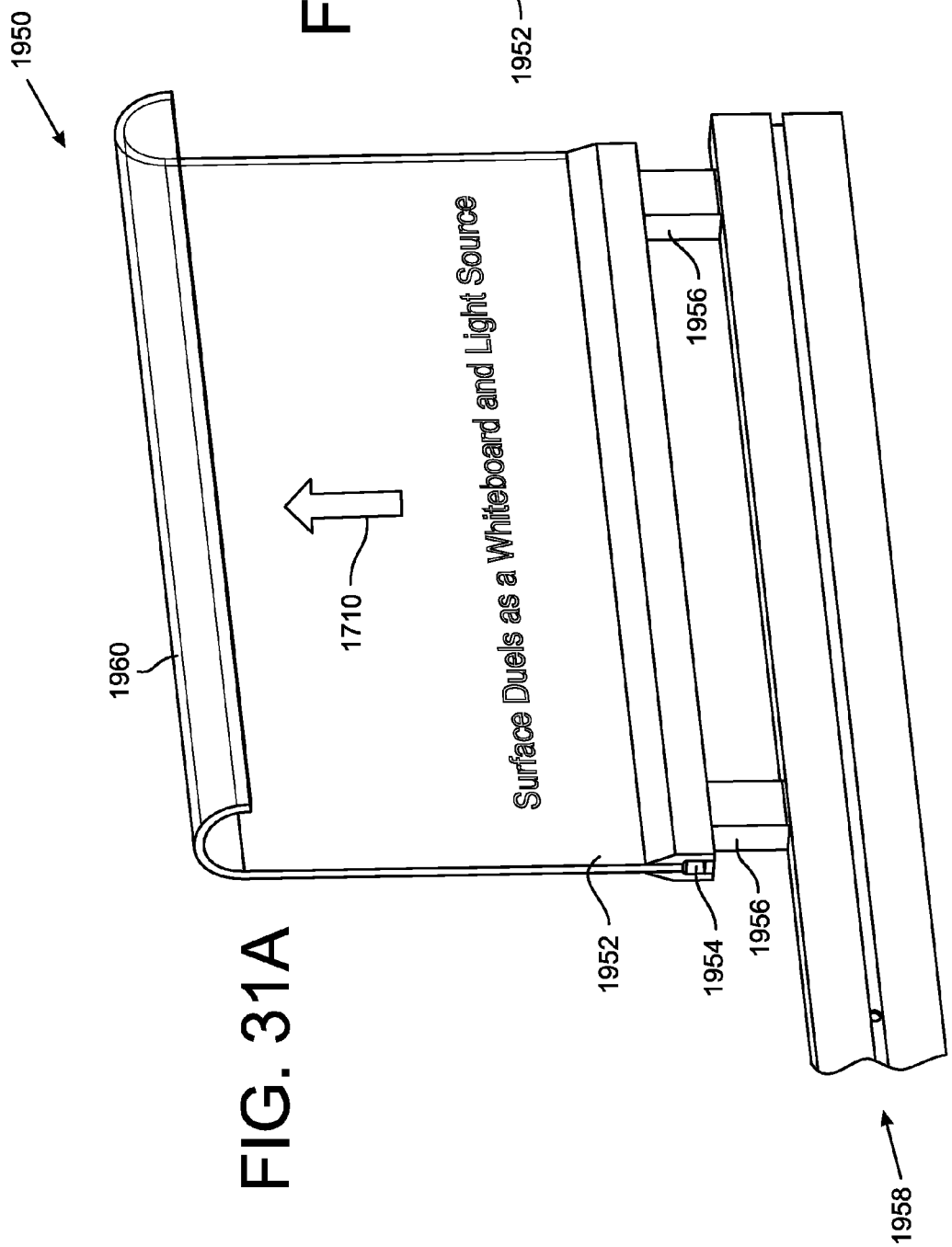

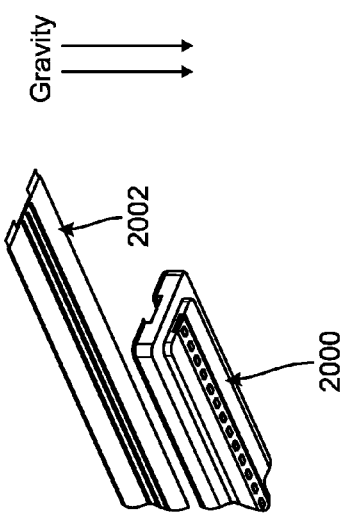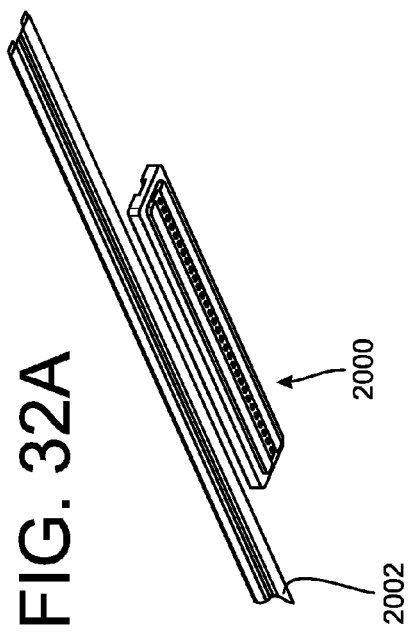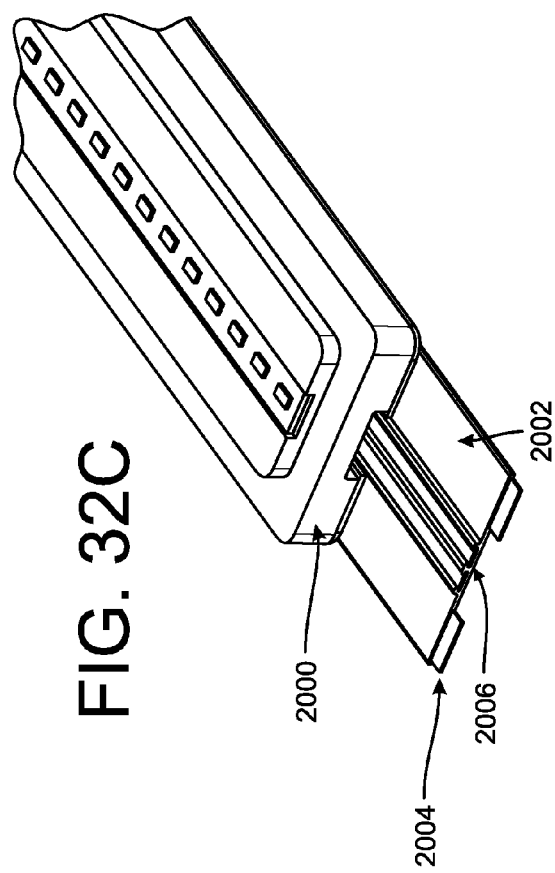

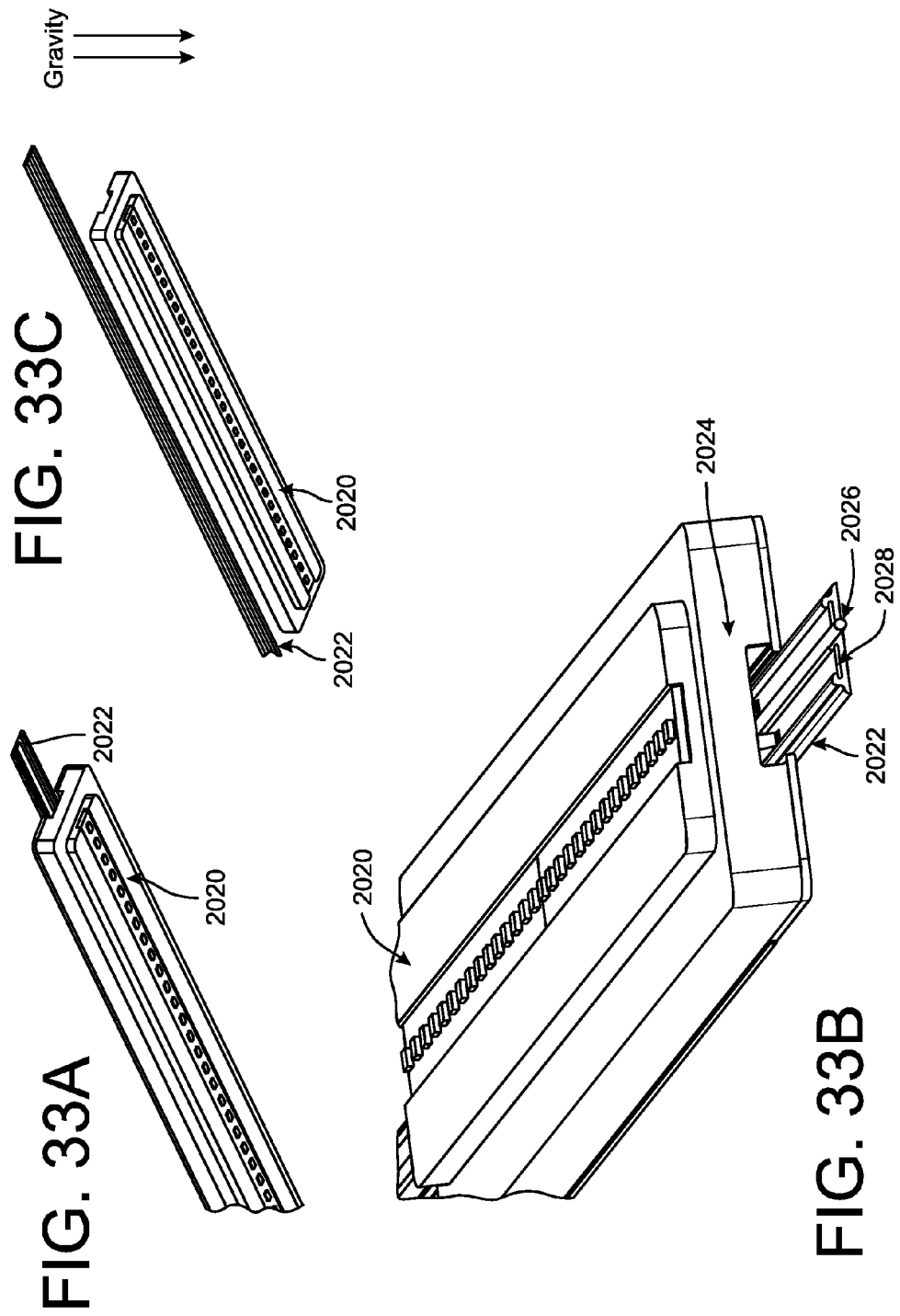

LOW VOLTAGE BUSS SYSTEM

CROSS REFERENCE TO RELATED APPLICATION

This application is a nonprovisional application claiming priority from U.S. Provisional Application Ser. No. 61/725,795, filed Nov. 13, 2012, entitled "LOW VOLTAGE BUSS SYSTEM"; from U.S. Provisional Application Ser. No. 61/768,907, filed Feb. 25, 2013, entitled "LOW VOLTAGE BUSS SYSTEM"; from U.S. Provisional Application Ser. No. 61/744,777, filed Oct. 3, 2012, entitled "CONDUCTIVE BUSS FOR OFFICE FURNITURE"; and from U.S. Provisional Application Ser. No. 61/744,779, filed Oct. 3, 2012, entitled "LOW VOLTAGE BUSS SYSTEM," each of which are incorporated herein by reference in their entireties.

FIELD OF THE DISCLOSURE

The present disclosure generally relates to a low voltage buss system, and more particularly, to a low voltage buss system that provides an electrical connection to, for example, office furniture.

BACKGROUND

America's power plants deliver electrical power for residential, commercial, and industrial use almost exclusively via high voltage alternating current (AC). However, an increasing percentage of devices found in such residences, businesses, and factories operate on low voltage direct current (DC) electrical power. For example, nearly all products that utilize rechargeable batteries, e.g., laptops, cellular telephones, smart phones, etc., require low voltage DC for power management and/or recharging of the device. Thus, the devices that utilize low voltage DC typically require transformer "bricks" that convert the AC voltage exiting typical electrical outlets to the DC voltage necessary to power such devices.

But these transformer "bricks" are not an efficient use of space and oftentimes do not efficiently convert AC voltage to DC voltage; that is, the conversion process usually wastes electricity. The cost of wasted electricity may be small for any particular device but can grow very large across an entire residence, office workspace, factory, etc. But today, with current DC loads including LED lighting and monitors, it is conceivable with efficient energy conversion, that a modern office can uses as little as 100 W of power. Also, Uninterruptible Power Supplies (UPS) for offices provide backup to the AC loads plugged into them by inverting the DC power stored in their internal batteries. With batteries as DC storage units, and the loads predominantly DC, a DC-based power delivery buss system with battery is simpler and more efficient and consequently the same capacity battery can provide backup power for a longer period by avoiding "double conversion." Additionally, as the trend toward energy efficiency grows, it is possible that buildings could directly receive DC voltage instead of AC voltage from alternative sources such as solar panels, wind turbines, etc. In such cases, these DC power sources would need to be converted to AC to work with the transforming bricks that will then convert back to low voltage DC. This is another form of "double conversion" that is even less efficient than the current situation. In any case, there is an identifiable need to bring low voltage DC power into the office workspace in a manner that promotes efficient energy usage and efficient workspace usage.

Further, as mentioned above, there is a trend towards efficient energy use in commercial buildings. For example, there is a push to reduce energy consumption from both plug loads and lighting, which can comprise approximately 20-30% and 20-25%, respectively, of total energy consumption in an office, retail, or other commercial space. The trend to reduce energy consumption in these buildings is driven by, among other things, energy use regulations. For example, certain energy use regulations require plug loads and lighting to be de-energized when the workspace is unoccupied.

To comply with such regulations in an office, it is known in the art that advanced power strips (APS) that plug into traditional 120 volt alternating current outlets can cut power to the desk top fixtures based on a control method (e.g., time or occupancy sensing). However, APS have limited functionality. Most APS can accommodate only a fixed, small number of plug loads and many times the transformer "bricks" cannot fit into adjacent sockets leading to more office workspace clutter. Moreover, APS are often bypassed by the office occupant due to inconvenient location or nuisance shutdowns, thus eliminating any energy savings.

As an alternative to APS, there is also an increased use of Building Management Systems (BMS) to save electricity in the commercial building environment. BMS may control numerous aspects of a building's energy use infrastructure, including, for example, overhead lighting. BMS, however, are complicated and expensive to implement in both new construction and existing buildings. Thus, there is an identifiable need for a lower cost, robust energy use reduction system to shed plug loads at a more local level in locations such as the office workspace environment.

Still further, as the work force becomes more mobile and flexible, the office workspace is also moving from an individual employee-centric workspace to a shared office workspace environment. For example, an office workspace may be occupied by an outside sales person in the morning, and then by a field technician in the afternoon, requiring quick and easy adjustments to accommodate the different needs of each occupant. Such different needs depend upon, for example, each occupant's dominant hand, height, personal preferences, physical limitations, and job duties. Accordingly, mechanically adjustable office furniture is a growing trend.

The increased need for mechanically adjustable office furniture is also driven by the trend towards smaller offices. Typical office workspaces have shrunk as businesses are attempting to use smaller and smaller office workspaces to curb costs and/or to encourage collaboration among colleagues. These smaller office workspaces have correspondingly smaller work surfaces. Mechanically adjustable shelving systems help lift various devices, e.g., phones, monitors, computers, etc., off the work surface to free-up additional work surface area for occupant use. One drawback of the currently available mechanically adjustable shelving systems is that they fail to address the electrical requirements of devices and force their power cords to dangle, which is both an eyesore and contributes to clutter of the already smaller office workspace. Because low voltage DC poses no real electrical shock risk, its use in office workspace enables readily accessible power for these devices. Thus, there is an identifiable need for improved mechanically adjustable office furniture that can be attained by bringing low voltage DC power into the office workspace efficiently.

To help achieve an energy efficient workspace, as previously mentioned, lighting is a target for reduction due to its contribution to the electrical bill of an office. Advances such as occupancy sensing and LED technology are helping reduce this energy use, but these lighting fixtures have limitations due to where the power enters the fixture and where the light output is needed. Additionally, LED technology brings new challenges to lighting in that the LED chips themselves need to be kept cool to achieve long life. Free standing light fixtures today usually have a base that rests on a surface, and electrical power comes through that base, travels up a neck to the socket and lamp so that the electrical power can be turned into light to be cast back down on the work surface. In all fixtures, this requires the electrical system to be routed through the entire fixture. In LED lighting, it requires a heat sink (normally made of a large mass of metal) at the top of the fixture. This can make the fixture top heavy, but also doesn't take advantage of the mass normally at the base of fixtures to prevent tipping. LED Luminaires that use edge lighting of clear panels can address some of these requirements, but they cast the light predominantly 90 degrees from the direction the light is emitted from the LED source, which doesn't direct the majority of the light toward the work surface where it is needed but into the face of the person at the work space. Consequently, there is also a clear need for light fixtures that have a light source near the base, but can also direct most of the light output back in the direction of the surface on which the base rests.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The present disclosure addresses at least some of the problems of distributing DC power or other signals into the office workspace in a manner that can potentially reduce clutter and promote customizable and efficient workspace usage. In one example, the disclosed system is able to distribute power, e.g., low voltage DC power or communication signals, into the office workspace via a buss having a connector attached thereto to distribute power, other signals, etc., to and throughout office furniture and other devices such as light fixtures, fans, electrical outlets, cup warmers, etc.

In one example, a conductive buss, such as an electrical buss, is affixed to an office furniture component and is connected to a source, and/or another buss, via a suitable connector. In one example, the connecter may attach to a panel slot of the office furniture component or may attach directly to the electrical busses affixed to the office furniture component. When the office furniture component has a panel slot, the connector bridges the circuit gap created by the panel slot to create an uninterrupted series of electrical busses. The conductive busses affixed to an office furniture component are sometimes collinear when connected via a connector. It is further contemplated that the conductive busses be affixed to many different types of office furniture components including, for example, cubicle walls, desktops, desk edges, desk legs, cabinets, file cabinets, credenzas, book shelves, or any individual or combination of these or other office furniture components. The conductive buss may be affixed to an office furniture component in any number of ways, including, for example, adhesive, hook-and-loop fastener, magnets, screws, integration into the office furniture components themselves, etc. Likewise, the devices that are attached to the conductive busses may be affixed in any number of ways, such as by using magnets in the devices and conductive busses so as to form a bond between devices and conductive busses. In these examples, devices may be secured electrically and mechanically to the conductive busses in a single step.

In another example, a connector having a push-in terminal receives two wires that deliver electrical power to a conductive buss. In this instance, the connector may still attach to a panel slot, which, itself, is fixed to the office furniture component having the busses affixed thereon. Alternatively, it is further contemplated that a mating terminal may be substituted for the push-in terminal disclosed above. In yet another example, the connector may contain a sensor that de-energizes the electrical buss when activated.

In another example, a conductive buss system incorporates an office furniture power supply to replace the transformer "bricks" ordinarily used in an office environment. In another example, a conductive buss system incorporates a sensor that provides feedback to switch on and off, increase, decrease, and/or otherwise control the power to an electrical buss depending on current energy needs. The switch and/or sensor may be located in a variety of locations. For example, in some instances the switch is oriented between a power supply and one or more conductive busses. In other examples, the power supply may contain the switch. Furthermore, the sensor may communicate via wire or wirelessly with a number of devices, such as the switch and/or the power supply, for example.

It will be understood by one of ordinary skill in the art that other physical configurations for a conductive buss system are within the scope of the present disclosure. For example, the conductive buss (or busses) may be engineered to have any particular cross-section shape that meets the functional and aesthetic needs of the particular low voltage buss system. As a further example, a conductive buss, such as an electrical buss, may be affixed to a vertically mounted slot system, a horizontal slot wall system that permits multiple vertical positioning options for a fixture to attach to the conductive buss system or to a horizontally mounted system disposed along a desktop surface. The electrical buss system could also be affixed to a non-conductive carrier that operates as a wire raceway that protects and/or conceals one or more wires or cables.

One of ordinary skill in the art will also understand that the disclosed applies equally to other types of conductive buss systems, e.g., communication, networking, PSTN, VOIP, Internet, ethernet, telephone, serial, USB, etc., in addition to or instead of electrical power buss systems described in detail herein.

Regarding electrically conductive busses, a wide variety of devices may be used with the disclosed busses. In some examples, these devices include edge-lit luminaires that may be electrically and mechanically coupled to the conductive busses. These edge-lit luminaires may generally include a light source such as a light-emitting diode (LED) near a base, a light guide, and an optical means for distributing the light onto a surface or other subject. In one example in particular, an optical means may be disposed on a light guide so as to distribute light from an end of the light guide as opposed to sides of the light guide. Example edge-lit luminaires include floor lamps, desktop lamps, whiteboards, and privacy screens, for instance.

BRIEF DESCRIPTION OF THE DRAWINGS

FIG. 20 depicts an example conductive buss having an engineered cross section shape and having an electrical bus and an integrated communication buss formed thereon.

FIGS. 26A-C depict example devices that can be electrically and mechanically coupled to the example busses of the present disclosure.

FIGS. 27A-C depict still another example device that can be electrically and mechanically coupled to the example busses of the present disclosure.

FIGS. 28A-D depict yet another example device that can be electrically and mechanically coupled to the example busses of the present disclosure.

FIGS. 29A-C depict an example device that can be electrically and mechanically coupled to the example busses of the present disclosure.

FIGS. 30A-C depict still another example device that can be electrically and mechanically coupled to the example busses of the present disclosure.

FIGS. 31A-B depict an example device that can be used as a whiteboard, a privacy screen, and a light source, for example.

FIGS. 32A-C depict an example configuration in which an example luminaire can be attached both mechanically and electrically in one step to a conductive buss using magnets.

FIGS. 33A-C depict another example configuration in which an example luminaire can be attached both mechanically and electrically in one step to a conductive buss using magnets.

DETAILED DESCRIPTION

The following description of example methods and apparatus is not intended to limit the scope of the description to the precise form or forms detailed herein. Instead, the following description is intended to be illustrative so that others may follow its teachings.

A conductive buss system that is incorporated into and/or is attached onto various office furniture components permits various signals to be conducted across a distance. For instance, in one example, an electrical buss allows a low voltage DC power to be introduced into the office workspace in a manner that reduces clutter and promotes customizable and efficient workspace usage. Without the need to "run wires or cables" from immovable electrical outlets or from remote devices, the office workspace can be tailored on an individual basis to reduce clutter and promote efficient office workspace usage. It will be appreciated by one of ordinary skill in the art that the described conductive buss and/or electrical buss may be any suitable conductive strip, bar, wire, etc. for conducting any suitable signal, including power, communications, etc. In other words, the described conductive buss is not limited to any particular conductive medium.

Figure 1:
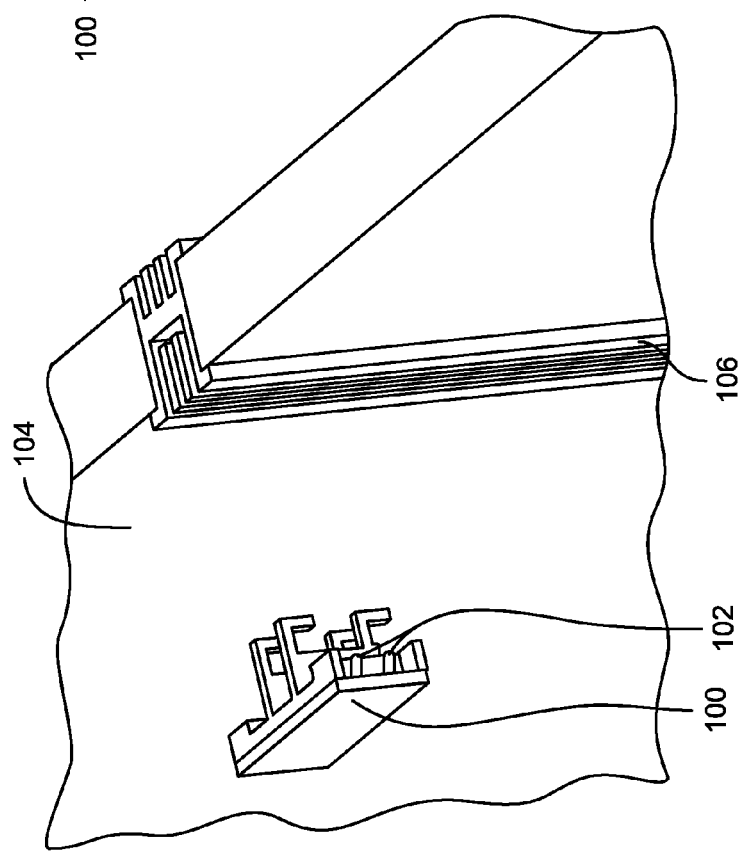
FIG. 1 depicts an example connector and an example office furniture component having a panel slot.

For instance, FIG. 1 illustrates an example connector 100 having two conductors 102 disposed thereon. The example connector 100 may be any suitable attachable and/or detachable connector having a larger or smaller number of conductors 102 depending on the type of conductive buss system on which the connector 100 is designed to attach. Similarly, the connector 100 may have an alternative geometric configuration designed to work with various, alternative conductive buss system configurations. In some examples, the connector 100 has one or more physical members configured to electrically couple to the conductive buss system. For instance, in some examples the connector 100 may comprise a wire lead extending to a device (e.g., a light fixture) to provide power thereto. As explained below, one or more terminals positioned on the connector may contact an exposed or partially exposed linear electrical buss when the connector is mated to a vertical mounting slot to provide a wired connection between the device and the electrical buss. For example, the device may be a light fixture, a fan, an ordinary 120 volt electrical outlet, a cup warmer, monitors, wireless sensors, etc. Those of ordinary skill in the art will understand that the device can comprise other devices not disclosed herein without departing from the spirit of the present disclosure. Likewise, those having ordinary skill in the art will understand that unless specified otherwise, the terms "device" and "fixture" may be used interchangeably throughout the present disclosure.

Figure 2:
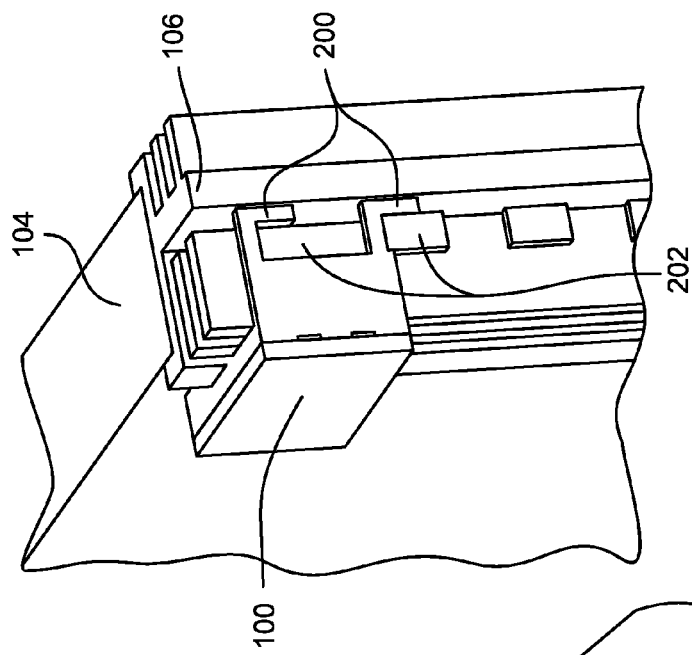
FIG. 2 depicts a cross sectional view of the panel slot of FIG. 1 illustrating how the connector of FIG. 1 may attach to the panel slot.

FIG. 1 also illustrates an example cubicle wall office furniture component 104 that incorporates a panel slot 106. Office furniture components other than cubicle walls may also incorporate panel slots such as the panel slot 106. The example connector 100 may be attached to the panel slot 106 as shown in FIG. 2, which illustrates a cross section of the example panel slot 106. In this example, the connector 100 has one or more attachment devices, such as hooks 200 that engage one or more corresponding protrusions 202 of the panel slot 106 to hold the connector 100 in place.

Figure 3:
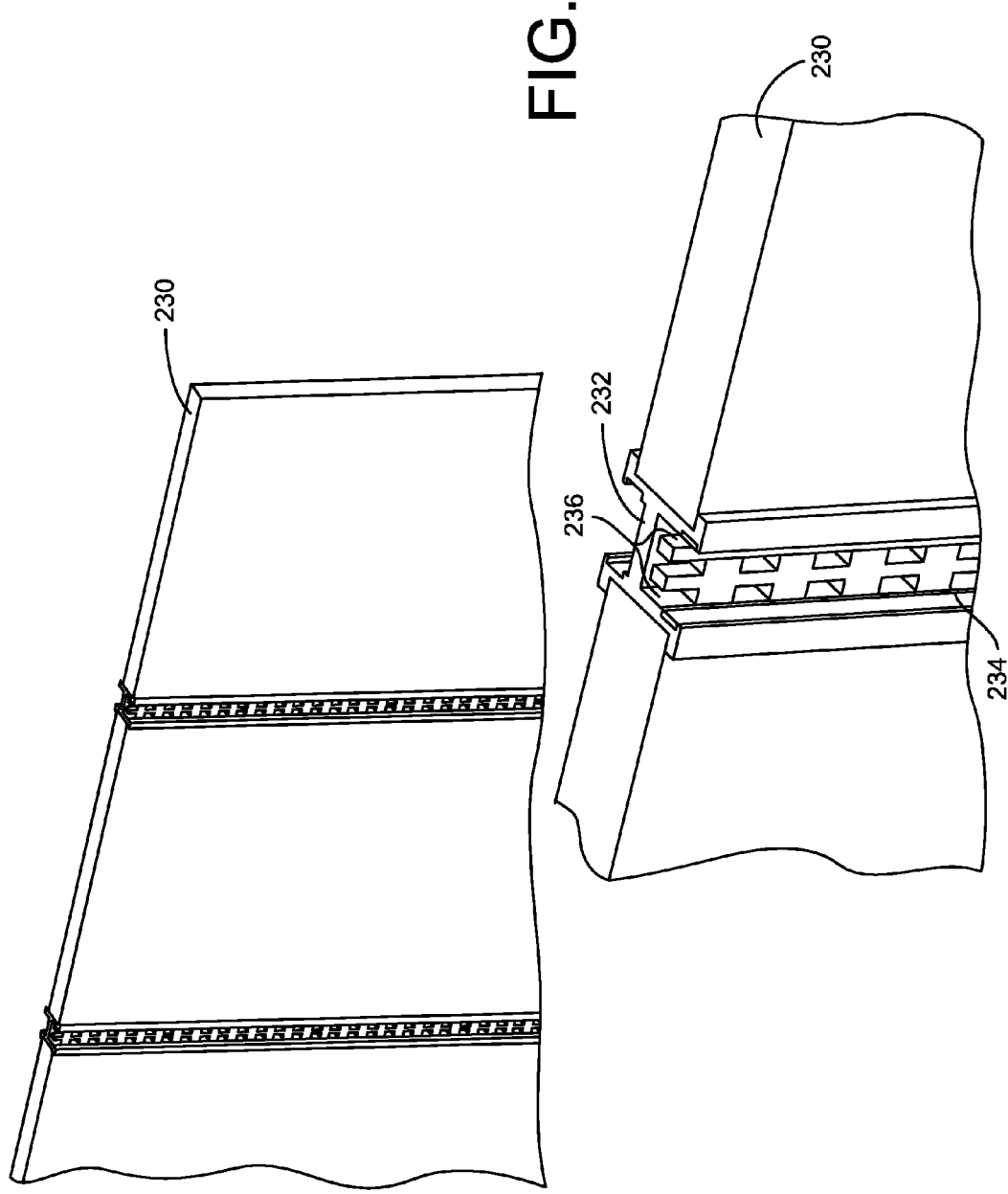
FIG. 3 depicts an example of a partially exposed linear electrical buss system incorporated into a vertical mounting slot of a cubicle wall office furniture component.

One of ordinary skill in the art will appreciate that the connector 100 may attach to the panel slot 106 using alternative hook 200 and/or protrusion 202 arrangements or using an entirely different physical attachment system, including, for example, bolts, screws, adhesive, magnets, hook-and-loop fasteners, solder, etc. For instance, a slightly different arrangement is shown in FIG. 3, which illustrates an example office furniture component 230 having several vertical mounting slots 232 contained therein. Partially exposed linear electrical busses 234 are incorporated vertically into an interior portion 236 of the vertical mounting slots 232 so as to permit a connector (not shown) access to the partially exposed linear electrical busses 234.

Figure 4:
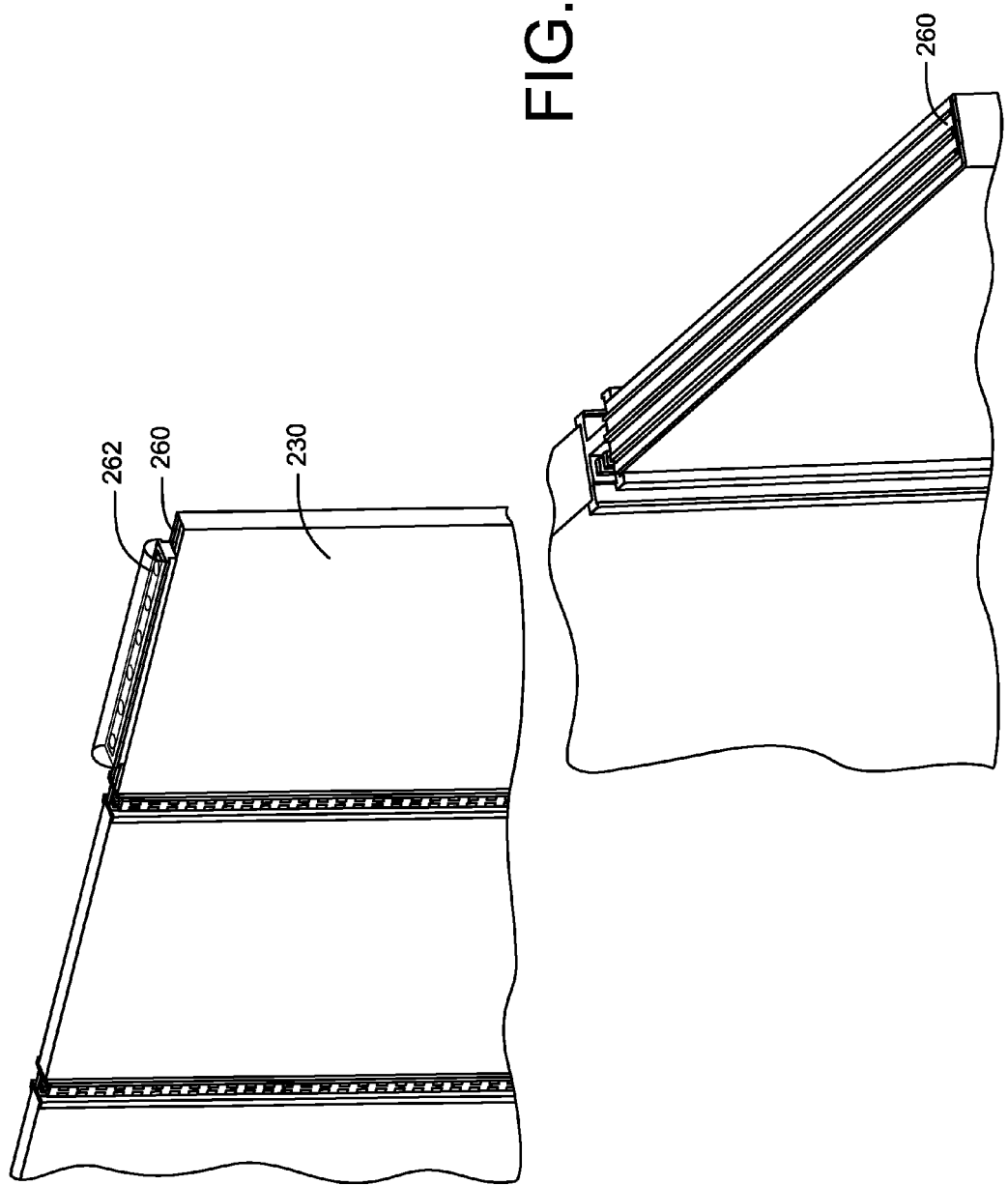
FIG. 4 depicts an example of a partially exposed linear electrical buss attached to the top edge of a cubicle wall office furniture component with an example light fixture attached to the partially exposed linear electrical buss.

The partially exposed linear electrical busses 234 of FIG. 3 may conduct electricity to an additional electrical buss 260 as shown in FIG. 4 that is not incorporated into the interior portion 236 of the vertical mounting slot 232. The additional electrical buss 260 may be disposed anywhere on the office furniture component 230. In some examples, a device, such as a fixture 262, may include an integrally formed load connector to attach directly to the additional electrical buss 260. Because the fixture 262 is movable to any location along the electrical busses 234 and the additional electrical buss 260, the fixture 262 permits customization of the office workspace to promote efficient workspace usage.

Figure 5:
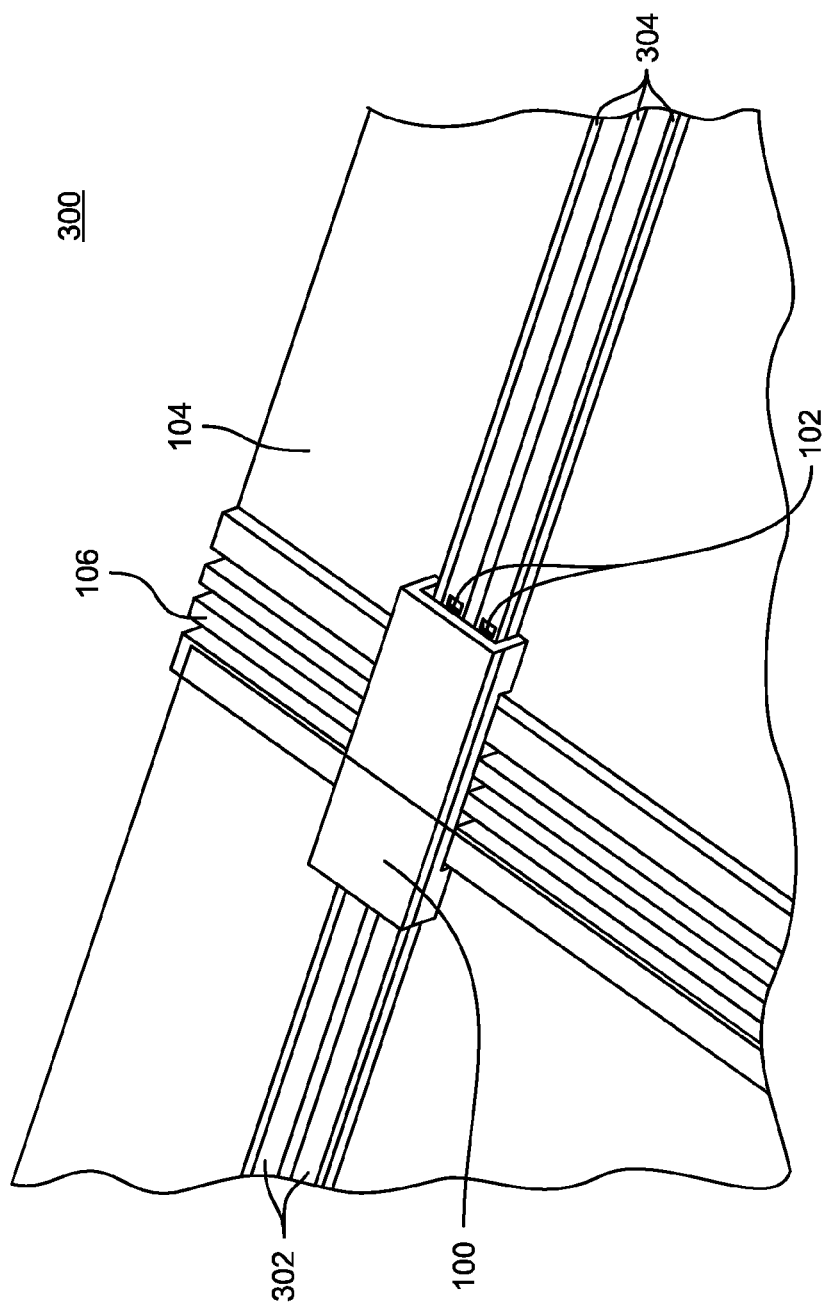
FIG. 5 depicts a conductive buss system in which the connector of FIG. 1 is attached to the panel slot to connect the conductive busses affixed to an office furniture component.

With reference now to FIG. 5, an example conductive buss system 300 is shown in which the example cubicle wall office furniture component 104 of FIGS. 1-2 incorporates the panel slot 106. In this example, a conductive buss (or busses) 302 is attached to the cubicle wall office furniture component 104. In this example, the conductors 102 of the connector 100 are spring-loaded conductors that contact the conductive busses 302 due to the resilient force exerted by the spring on the conductors 102 when the connector 100 is attached to the panel slot 106. In this way, the connector 100 bridges the gap between the conductive busses 302 created by the non-conductive panel slot 106, thereby creating an uninterrupted circuit between the conductive busses 302 attached to the cubicle wall office furniture component 104. It will be appreciated that the connector 100 may have non-spring loaded conductors 102 as long as the conductors 102 contact the conductive busses 302 when the connector 100 is attached to the panel slot 106. Moreover, in certain office furniture component configurations, the connector 100 may attach directly to the conductive busses 302, rather than the panel slot 106. The connector 100 may provide mechanical support for the conductive busses 302, that is, the connector 100 may help to hold the conductive busses 302 in place against the office furniture component 104.

Further, in some examples, a non-conductive carrier 304 may surround the conductive busses 302. The non-conductive carrier 304 may have a series of mechanical undercuts that permit a device that incorporates a corresponding series of mechanical undercuts, e.g., a wireless charging station, to "snap" or "pop" directly onto the conductive busses 302, thereby creating both a mechanical and conductive connection between the device and the conductive busses 302.

In the example of FIG. 5, the conductive busses 302 are collinear, but one of ordinary skill in the art will understand that the conductive busses 302 may be perpendicular or, in still other alternative configurations, the connector 100 may have an alternative geometric configuration to accommodate non-collinear conductive busses 302. One of ordinary skill in the art will further appreciate that the connector 100 may have a geometric configuration such that it can connect three or more conductive busses as desired. Moreover, the conductive busses 302 may be incorporated or attached to office furniture components 104 other than cubicle walls, including, for example, desktops, desk edges, desk legs, cabinets, file cabinets, credenzas, book shelves, and/or any suitable individual or combination of these or other office furniture components. Likewise, the present disclosure contemplates that the conductive busses 302 may be incorporated into or attached onto any of these office furniture components 104 via magnets, bolts, screws, adhesives, hook-and-loop fasteners, etc.

Figure 6:
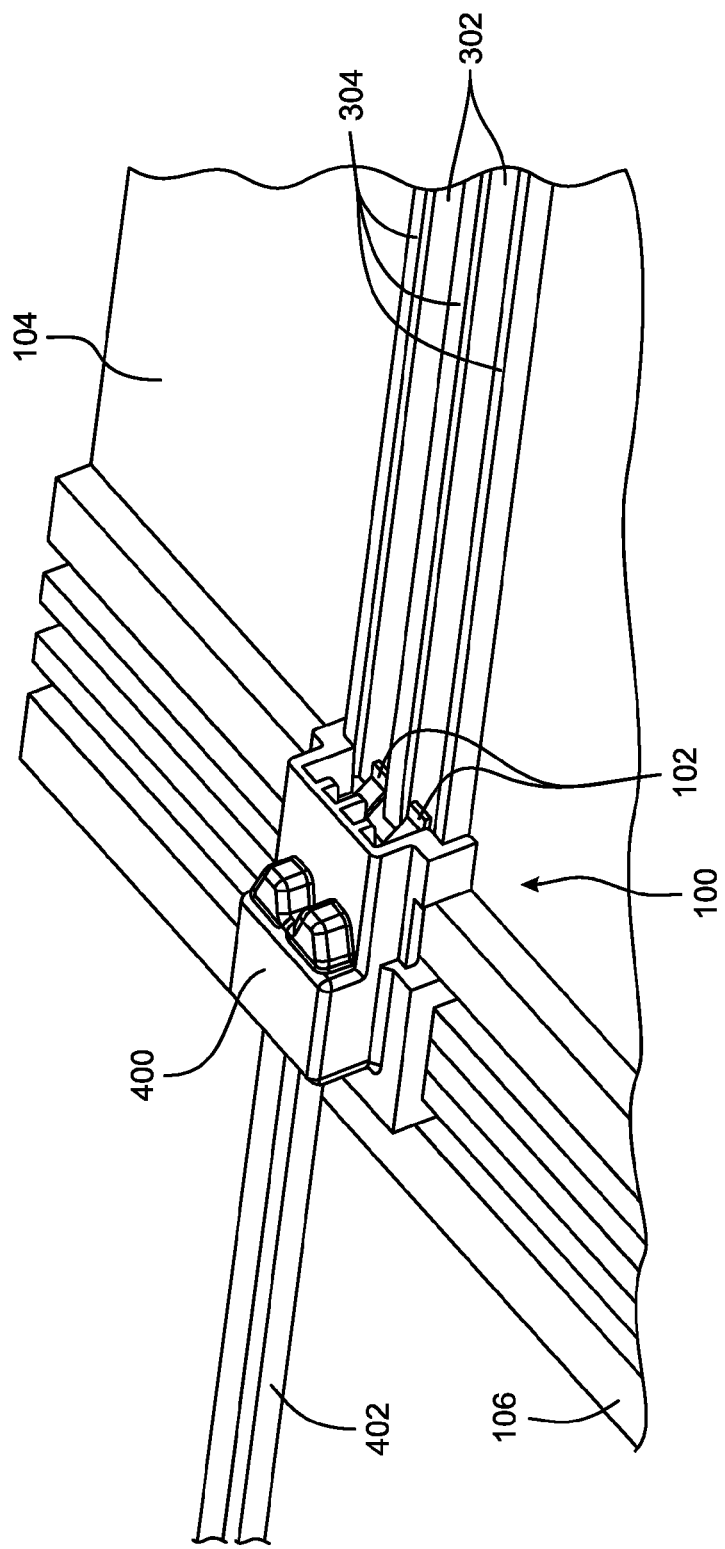
FIG. 6 depicts an example connector having a push-in terminal that connects the conductive busses affixed to the office furniture component to a power source.

In a different example, as illustrated in FIG. 6, the example connector 100 has a push-in terminal 400. The example push-in terminal 400 receives wires 402 carrying low voltage DC (or other suitable signal) from a source, e.g., a power source. The wires 402 may conduct electricity, or other signal, to the conductors 102 of the connector 100. The conductors 102 may then conduct electricity, or other signal to the conductive busses 302 attached to the cubicle wall office furniture component 104.

As noted above, a power source can provide low voltage DC (or other suitable signal) to a conductive buss. In some examples, a power source or supply may have multiple modes of operation, including, for example, a low power usage standby mode and a full power use mode. By having a power source (or supply) that can switch between two or more modes of operation, more efficient energy usage can be achieved. One of ordinary skill in the art will appreciate that a power source or supply may have other modes of operation beyond those disclosed herein.

In some examples of the present disclosure, a power source or supply may communicate with a Building Management System (BMS). A BMS can control numerous aspects of a building's energy use infrastructure. For example, a BMS can control where and when power is supplied (or not supplied) to the various voltage output channels throughout a building. In particular, a BMS may control when power is routed to the following example voltage output channels: the building's light system, outlets, HVAC system, etc. In some examples, the power source may communicate with a BMS through a gateway. As a result, the BMS can switch the power state (e.g., power-on, power-off) of any of the building's various voltage output channels.

Figure 7:
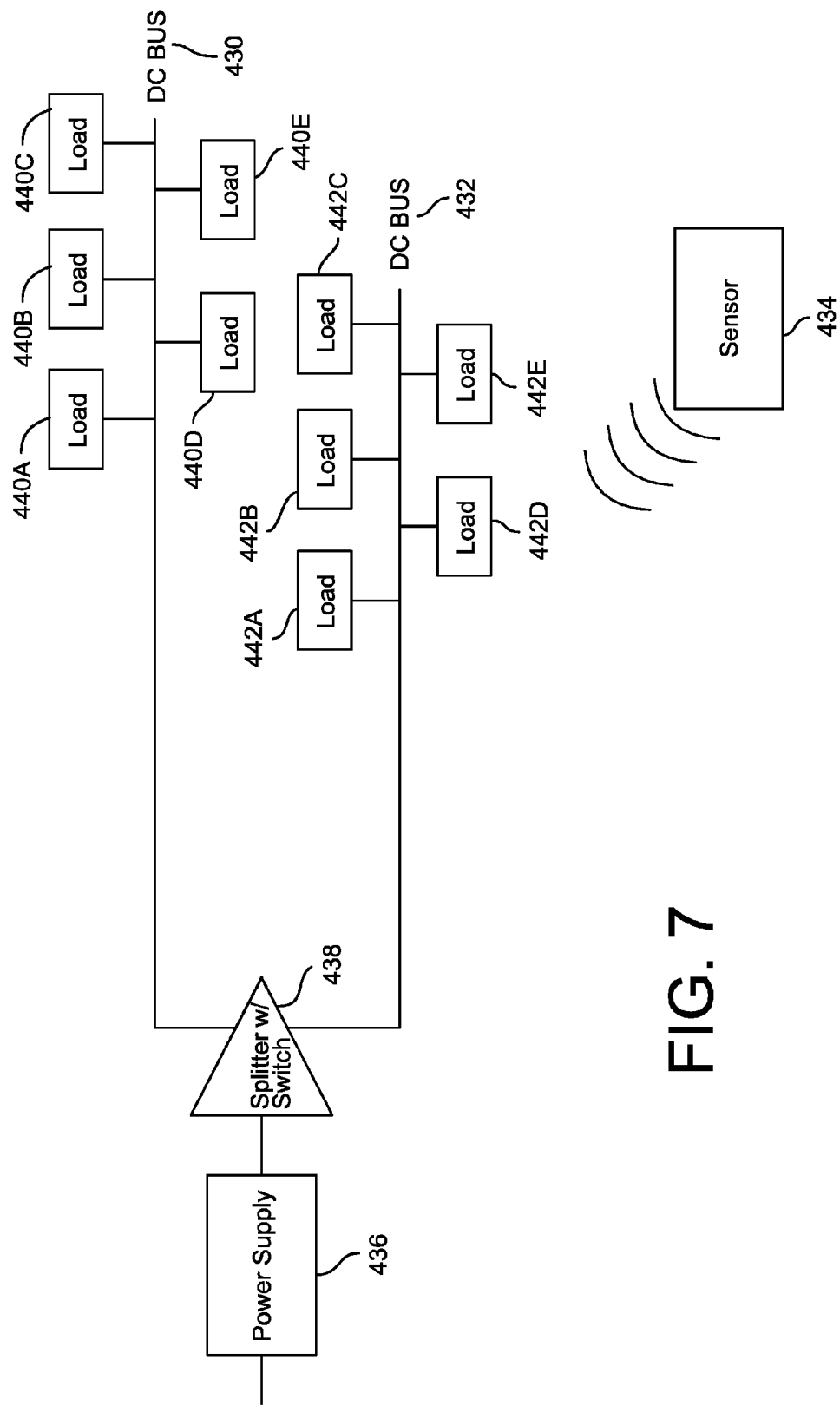
FIG. 7 depicts an example circuit diagram of an example conductive buss system in which a splitter is used to control the power supply to busses.

One way of controlling the flow of electrical power (e.g., switching on/off, increasing/decreasing, etc.) to an electrical buss, such as a buss 430 or a buss 432 shown in FIG. 7, is through the use of a sensor 434. When activated, the sensor 434 may provide feedback to a power supply 436, power source, and/or other devices that causes a mechanism such as a switch 438, for instance, to turn power on or off to one or more electrical busses, such as the busses 430, 432. The example switch 438 may be located in a wire splitter in some examples. In one example, the sensor 434 may communicate directly with the switch 438, which in some examples may be oriented between the power supply 436 and the busses 430, 432. Each of the electrical busses 430, 432 may be connected to, respectively, one or more devices 440A-E, 442A-E drawing a load from each of the busses 430, 432 when energized. Further, the sensor 434 may be any kind of sensor, including, for example, a motion sensor that cuts off power to one of the electrical busses 430, 432 when motion is not detected for a certain period of time. Those of ordinary skill in the art will appreciate that other types of sensors may be used as well. In some examples, the sensor 434 may be built into a power supply 436. In other examples, the sensor 434 may be located remotely from the power supply 436. The sensor may communicate with the power supply 436 and/or the switch 438 via wiring or wirelessly via any suitable communication protocol.

Figure 8:
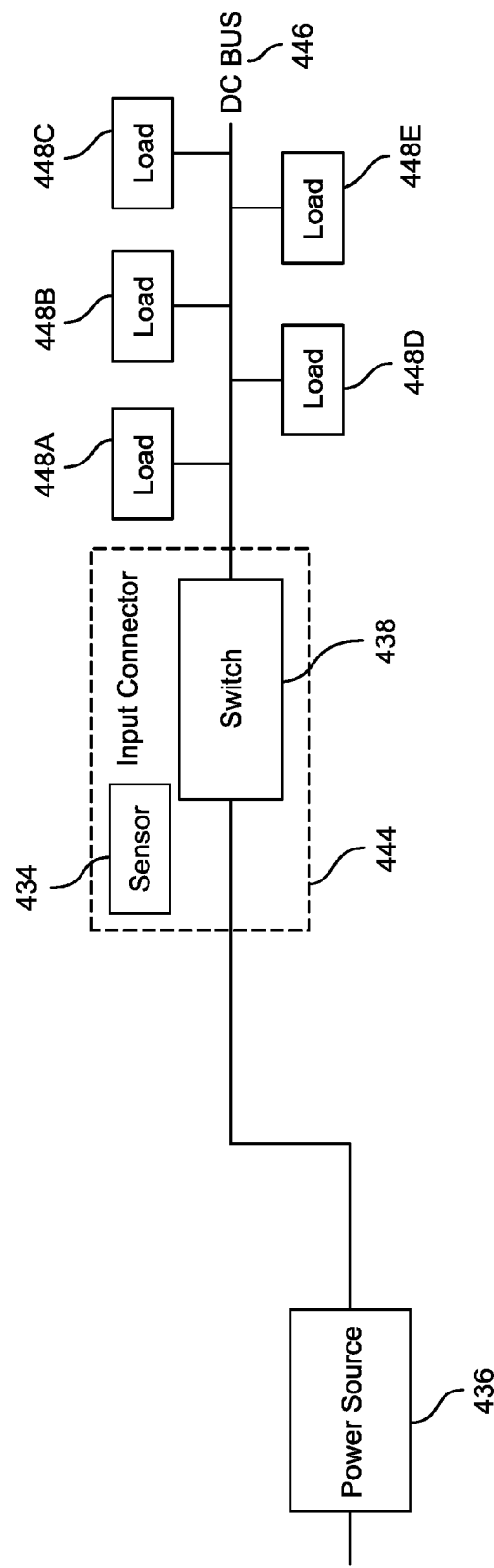
FIG. 8 depicts an example circuit diagram of an example conductive buss system in which a connector includes a switch and a sensor used to control the power supply to the buss.

The present disclosure contemplates a wide variety of configurations beyond the example shown in FIG. 7. For instance, one such further example configuration is shown in FIG. 8. Accordingly, the example switch 438 and the example sensor 434 are included within a connector 444 providing power from the power source 436 to an electrical buss 446. When energized, the buss 446 may in turn provide a load to a plurality of devices 448A-E. In still other examples, the power supply may include the sensor and/or the switch.

Figure 9:
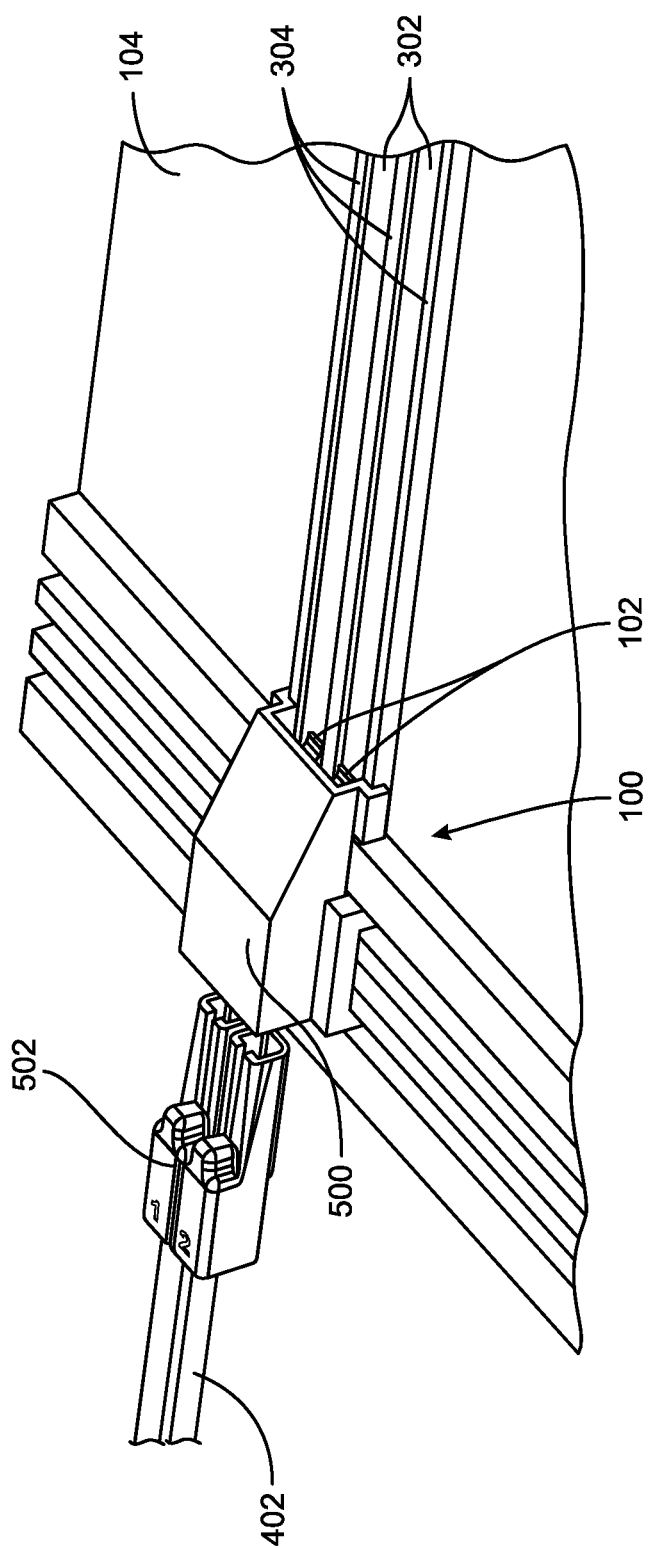
FIG. 9 depicts another example connector having a mating terminal that connects the conductive busses affixed to the office furniture component to a power source.

Nonetheless, in another alternative example, the example connector 100 has a mating terminal 500, as shown in FIG. 9. In this instance, the wires 402 conduct low voltage DC (or other suitable signal) from a source, for example, a power source, to a connector 502. The connector 502 may conduct the low voltage DC, or other suitable signal, to the mating terminal 500. The mating terminal 500 may then conduct the low voltage DC, or other suitable signal, to the conductors 102. The conductors 102 may conduct the low voltage DC, or other suitable signal, to the conductive busses 302 attached to the cubicle wall office furniture component 104. In another example, the mating terminal 500 may not have conductors 102, and the connector 502 might connect directly to the conductive busses 302. In other words, the mating terminal 500 may comprise only a housing such that the connector 502 directly contacts the conductive busses 302 when the connector 502 is inserted into the mating terminal 500.

Figure 10:
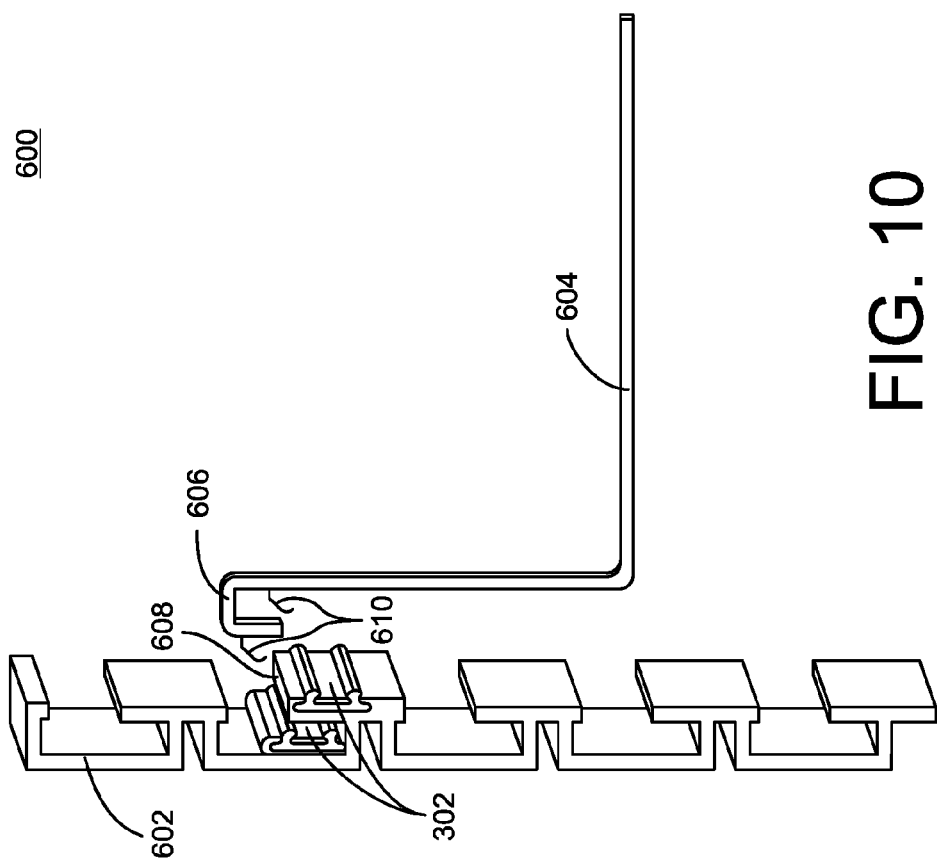
FIG. 10 depicts another example conductive buss system incorporated into a vertically mounted slot system.

Other physical configurations for the conductive buss system, such as slotted conductive buss system configurations, are also within the scope of the present disclosure. For example, FIG. 10 illustrates a vertical slotted conductive buss system 600. In this example, the conductive busses 302 are attached to a vertically mounted slot system 602. The connector 604 has a hooked portion 606 that engages a non-conductive protruding tab 608 of the vertically mounted slot system 602 such that the conductors 610 of the connector 604 contact the conductive busses 302 that are attached to the vertically mounted slot system 602. The connector 604 can then transmit low voltage DC (or other suitable signal) to additional busses located in other areas of the office workspace or to a device, e.g., a light fixture, wireless charging station, ordinary 120V electrical outlets, monitors, wireless sensors, etc., that, itself, draws electricity. It will be appreciated that other configurations such as a horizontally slotted conductive buss system configuration, among others, is likewise within the scope of the present disclosure.

Figure 11:
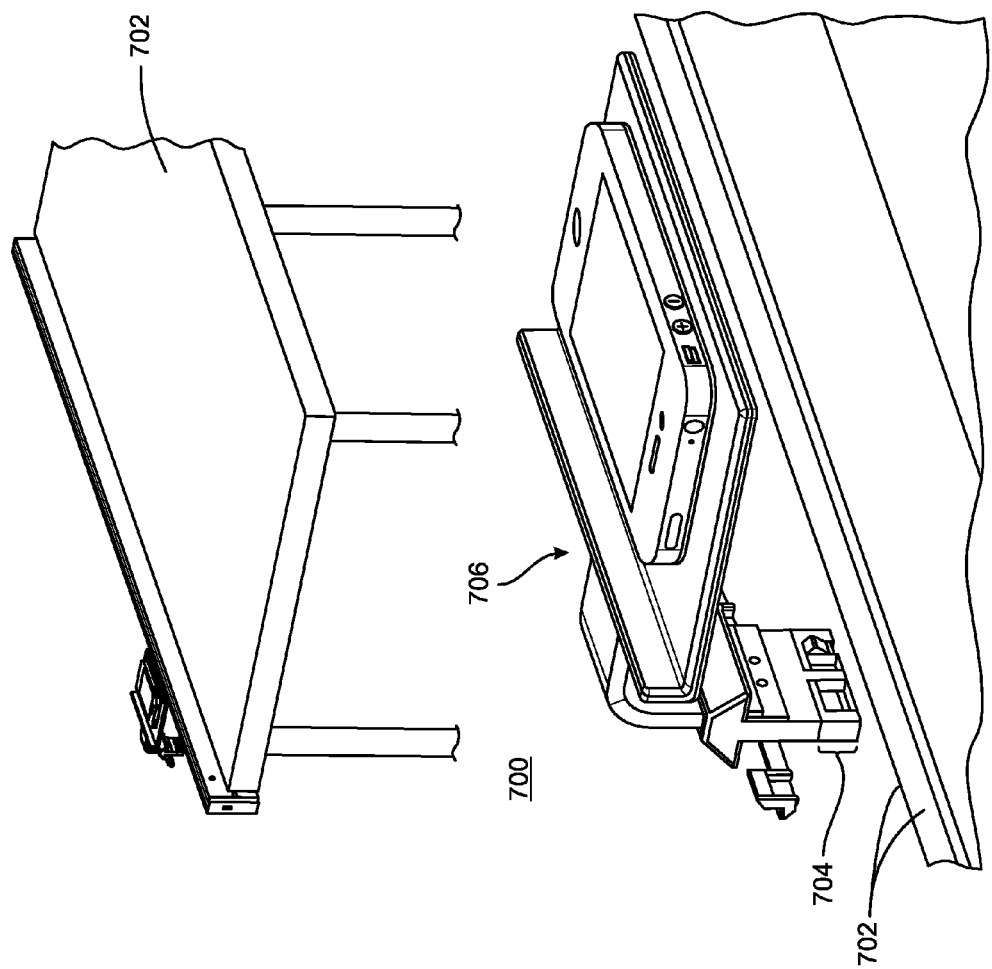
FIG. 11 depicts an example horizontally mounted attachment of the conductive buss system disposed along a desktop surface.

FIG. 11, meanwhile, illustrates an example horizontally mounted conductive buss system 700 disposed along a desktop surface 702. A connector 704 can attach anywhere along the desktop surface 702, such that low voltage DC (or other suitable signal) is conducted from the conductive busses 302 through the connector 704 to a device 706, e.g., a wireless charging station. It is further contemplated that devices other than wireless charging stations, including, for example, lights, ordinary 120V electrical outlets, monitors, wireless sensors, USB connections, etc. are within the scope of the present disclosure. Further, those having ordinary skill in the art will appreciate that in certain instances, the connector 704 will be integrally connected to the device 706 such that mechanical and electrical attachment of the device 706 to a buss system can be accomplished in a single action. The desktop surface 702 along with the buss system 700 may be raised or lowered to a particular height that best suits the office workspace needs of the current office workspace occupant.

Other example horizontal electrical busses may incorporate one or more horizontal channels. The horizontal channel may cooperate with the horizontal electrical buss to permit a device to attach both mechanically to the office furniture and electrically to the electrical buss. In certain examples, the geometry of the horizontal electrical buss and horizontal channel will permit the device to attach mechanically to the office furniture and electrically to the horizontal electrical buss in a single action. That said, any suitable horizontal electrical buss and horizontal channel geometry that permits a device to attach mechanically to the office furniture and electrically to the horizontal electrical buss, whether in one or more actions, is within the scope of the present disclosure. In some examples, the geometry of the horizontal electrical buss and horizontal channel(s) will permit a device to attach to the horizontal electrical buss in a limited number of locations. Other examples will permit the device to attach to the horizontal electrical buss in an infinite number of locations. While this example is described as horizontal, one of ordinary skill in the art will appreciate that any suitable arrangement for the electrical busses and channels (e.g., vertical, diagonal, embedded, partially exposed, etc.) may be utilized.

A further example conductive buss system may incorporate a slot wall that has a series of horizontal slots to accommodate one or more electrical busses. Each electrical buss can be placed into a particular horizontal slot to provide multiple vertical positioning options for a particular device. For example, an electrical buss can be inserted into a horizontal slot located at eye level to accommodate a computer monitor (or other suitable device). As a further example, an electrical buss can be inserted into a horizontal slot located at foot level to accommodate a space heater (or other suitable device).

Still other example conductive buss systems that incorporate a slot wall can accommodate electrical busses having different polarities. For instance, two electrical busses having different polarities can be aligned in adjacent horizontal slots. Each such horizontal slot could have a different slot width, to ensure the proper polarity of the electrical busses and proper operation of any device attached thereto. Alternatively, the two electrical busses (of differing polarity) can be inserted into the same horizontal slot in an orientation that ensures proper polarity and operation of any device attached to the two electrical busses. In still other examples, the conductive buss system may incorporate an electronic device to correct the polarity of a device, as is well known by those of ordinary skill in the art.

Figure 12:
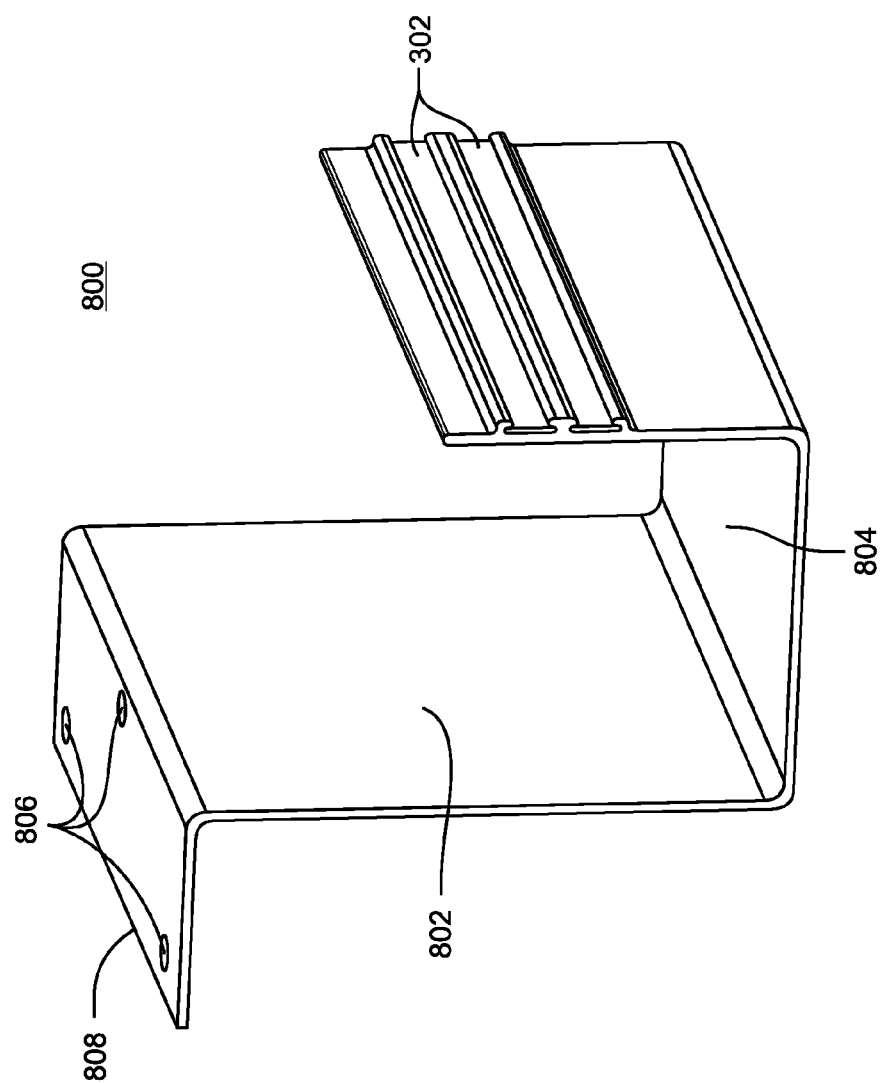
FIG. 12 depicts an example conductive buss attachment incorporated into a non-conductive carrier that operates as a wire raceway.

FIG. 12 illustrates a further example conductive buss system 800 in which the conductive busses 302 are attached to a non-conductive carrier 802 that operates as a wire raceway. The non-conductive carrier 802 has a gutter 804 that may protect and/or conceal one or more wires or cables running through the gutter 804 of the non-conductive carrier 802. One of ordinary skill in the art will appreciate that different non-conductive carrier 802 and gutter 804 geometric configurations that protect and/or conceal wires or cables are within the spirit of the present disclosure. The non-conductive carrier 802 may be attached to an office furniture component 104 via any suitable mounting means, including, for example, screws inserted through one or more holes 806 located in an upper surface 808 of the non-conductive carrier 802. One of ordinary skill in the art will understand that the non-conductive carrier 802 may attach to the office furniture component 104 using magnets, adhesive, hook-and-loop fastener, bolts, solder, etc., and still be within the scope of the present disclosure.

Figure 13:
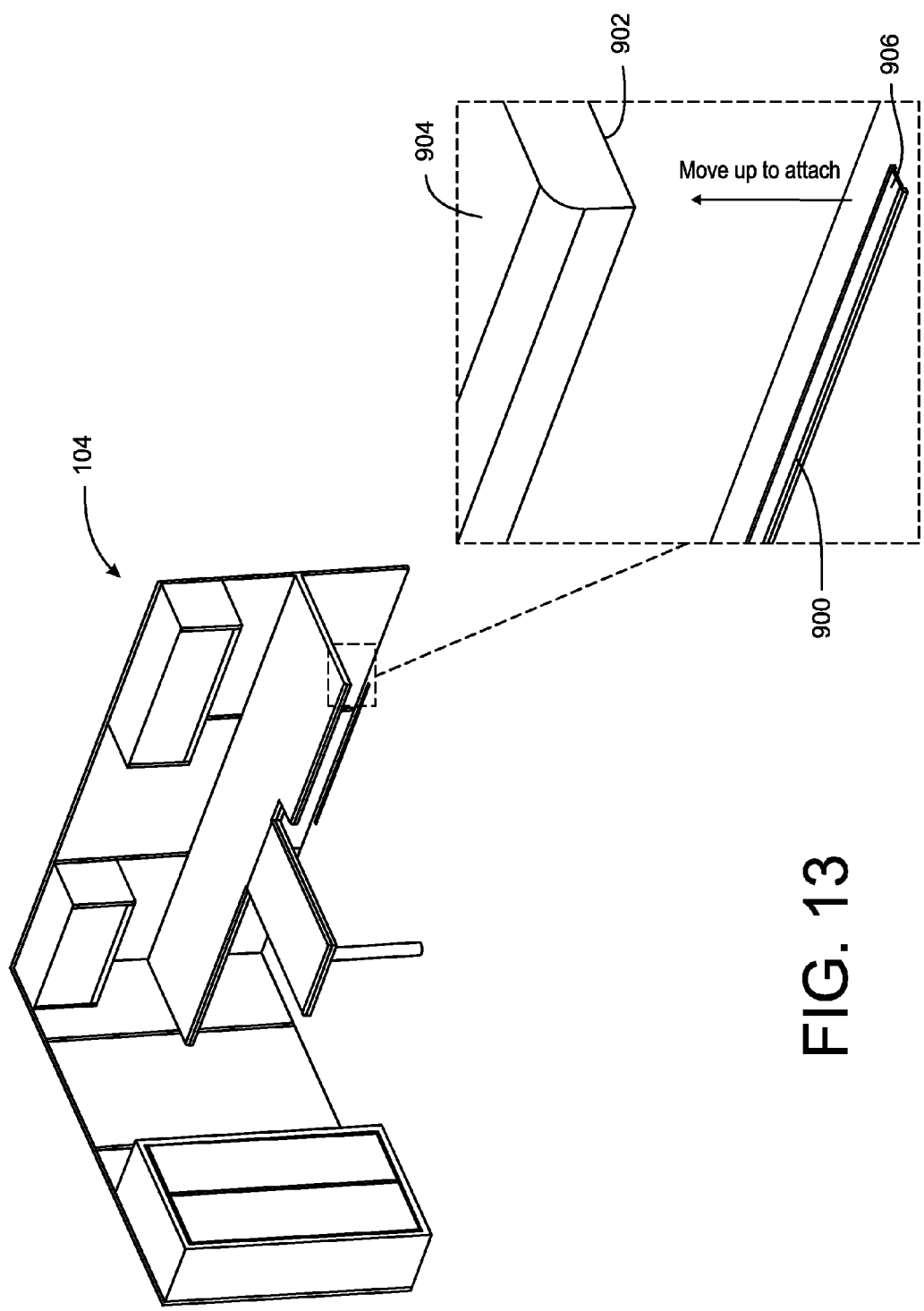
FIG. 13 depicts an example conductive buss that attaches to the underside of a desk office furniture component by way of an adhesive.
Figure 14:
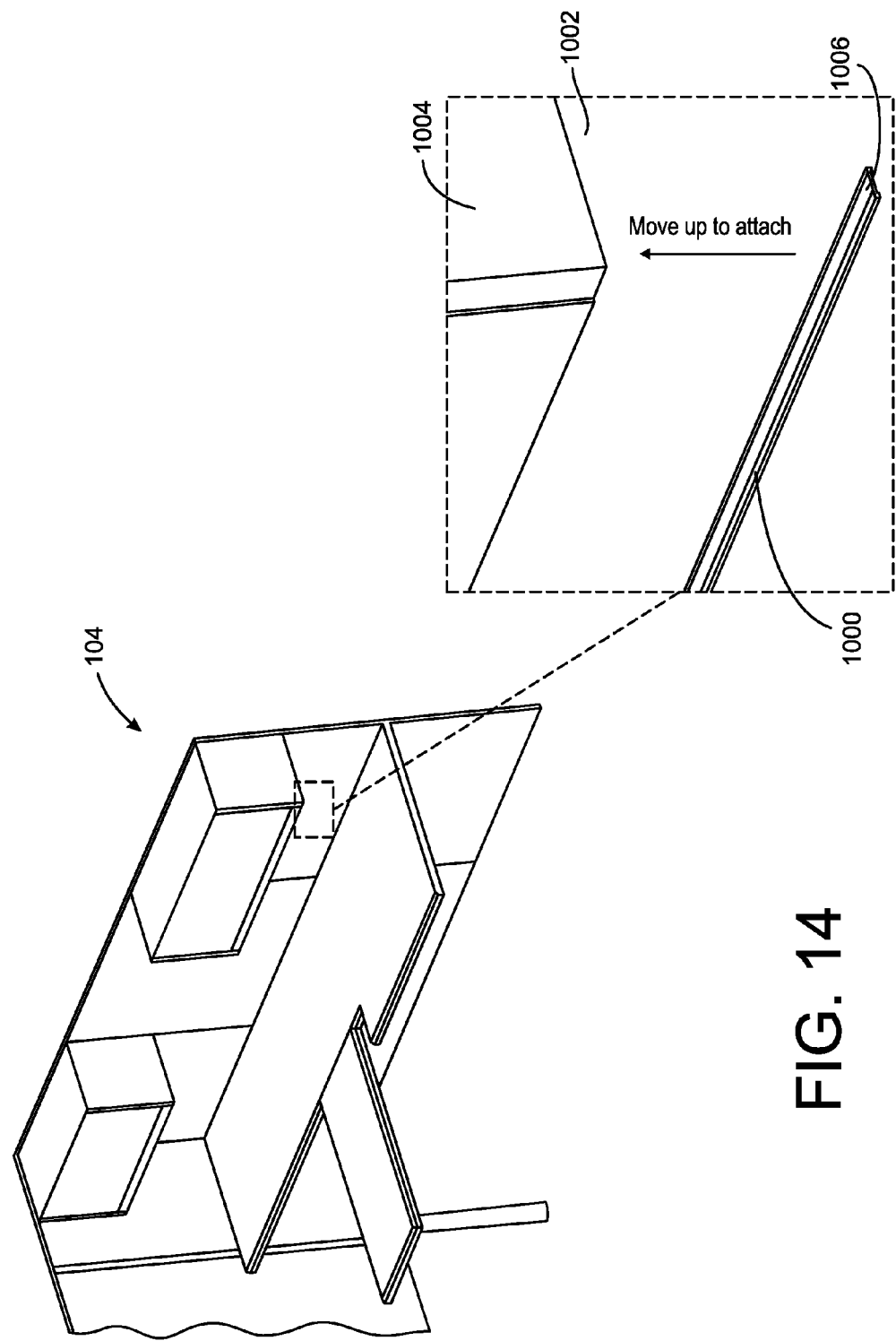
FIG. 14 depicts an example conductive buss that attaches to the underside of a cabinet office furniture component by way of a magnet.
Figure 15:
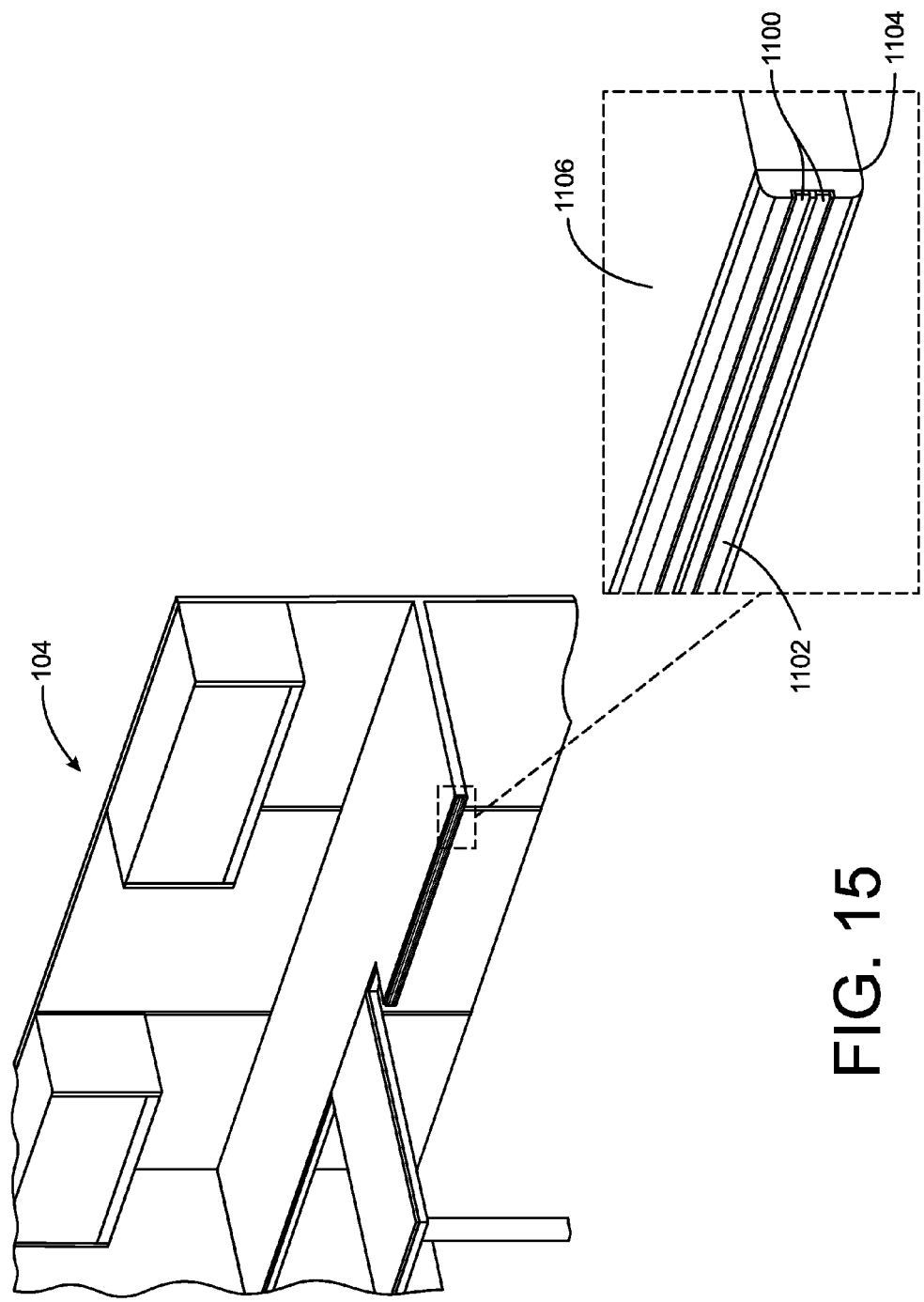
FIG. 15 depicts an example conductive buss incorporated into the edge of a desk office furniture component by way of a desktop edge banding.

FIGS. 13, 14, and 15 illustrate several additional possible ways in which a conductive buss may be attached to office furniture components 104. For example, in FIG. 13, a conductive buss 900 is affixed to an underside 902 of a desktop office furniture component 904 via an adhesive strip 906. In another example illustrated in FIG. 14, a conductive buss 1000 is affixed to an underside 1002 of a cabinet office furniture component 1004 via a magnet 1006. In the example described in FIG. 15, a conductive buss 1100 is incorporated into a banding 1102 that is affixed to a desktop edge 1104 of a desktop office furniture component 1106. These example buss attachment techniques, and others, can be applied to previously designed and manufactured, i.e., stock office furniture components.

Figure 16:
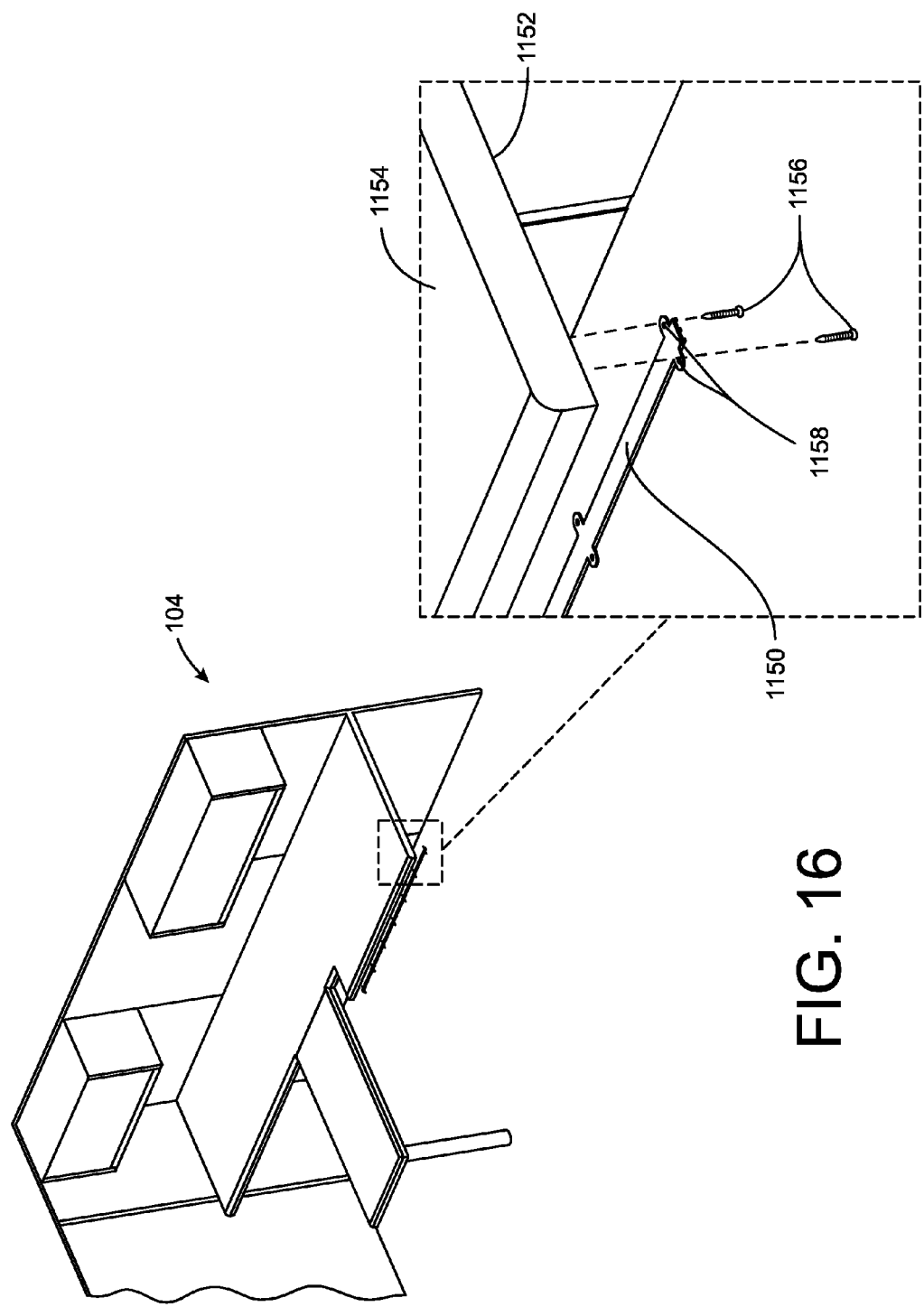
FIG. 16 depicts an example conductive buss that attaches to the underside of a desk office furniture component.
Figure 17:
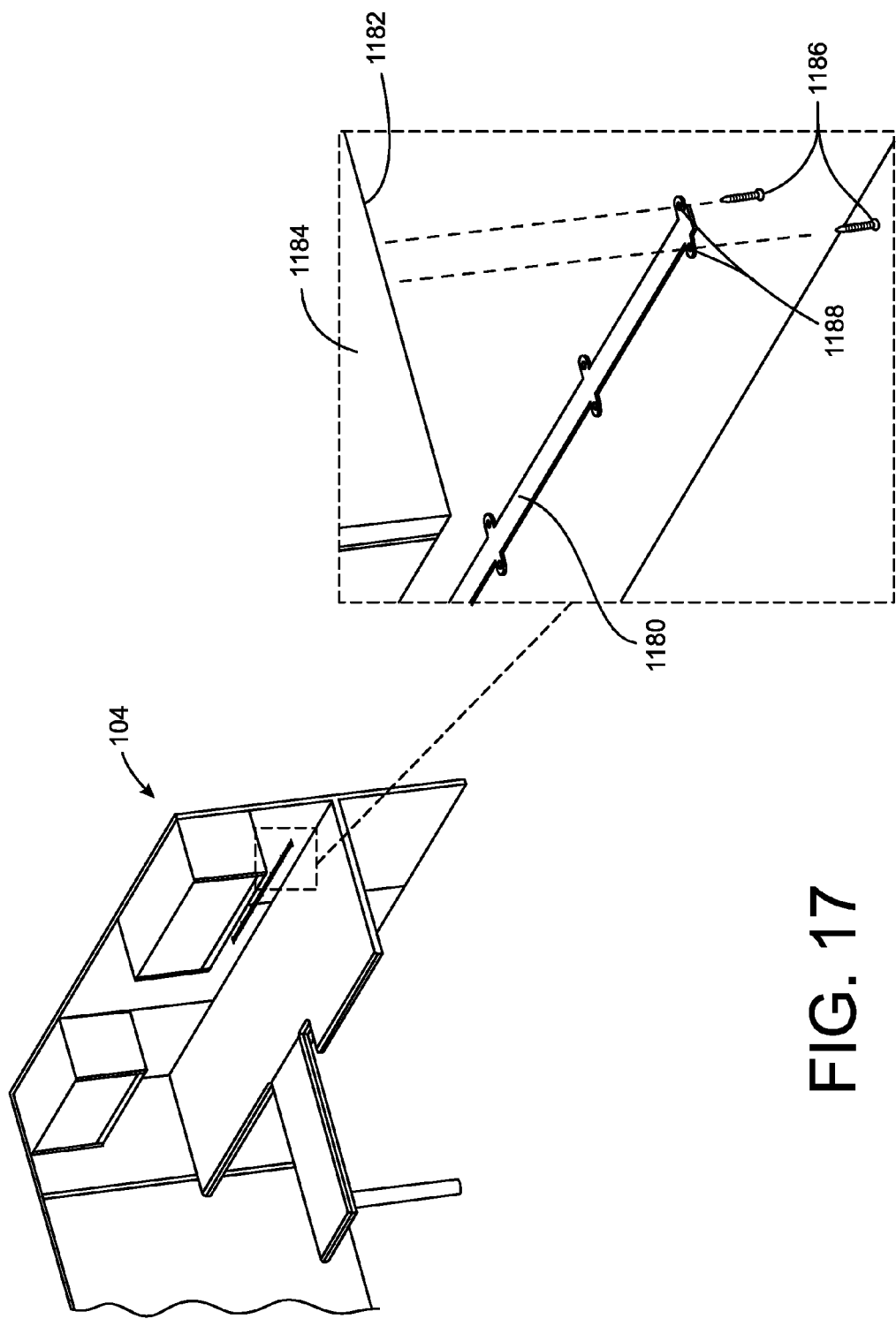
FIG. 17 depicts an example conductive buss that attaches to the underside of cabinet office furniture component.

FIGS. 16 and 17 illustrate still further possible ways in which a conductive buss may be attached to office furniture components 104. For example, in FIG. 16, a conductive buss 1150 is attached to an underside 1152 of a desktop office furniture component 1154 by inserting one or more screws 1156 through one or more holes 1158 of the conductive buss 1150 and into the underside 1152 of the desktop office furniture component 1154. As a further example, FIG. 17 depicts a conductive buss 1180 as attachable to an underside 1182 of a cabinet office furniture component 1184 by inserting the one or more screws 1186 through the one or more holes 1188 of the conductive buss 1180 and into the underside 1182 of the cabinet office furniture component 1184.

One of ordinary skill in the art will appreciate that there are additional ways to attach the conductive buss (or busses) to office furniture components 104 without departing from the scope of the present disclosure. Similarly, one of ordinary skill in the art will understand that the conductive buss may be attached to any location of any type of office furniture component 104 so long as the office furniture component 104 serves the needs of the person or group of persons using the office workspace in which the office furniture component 104 is situated.

Figure 18:
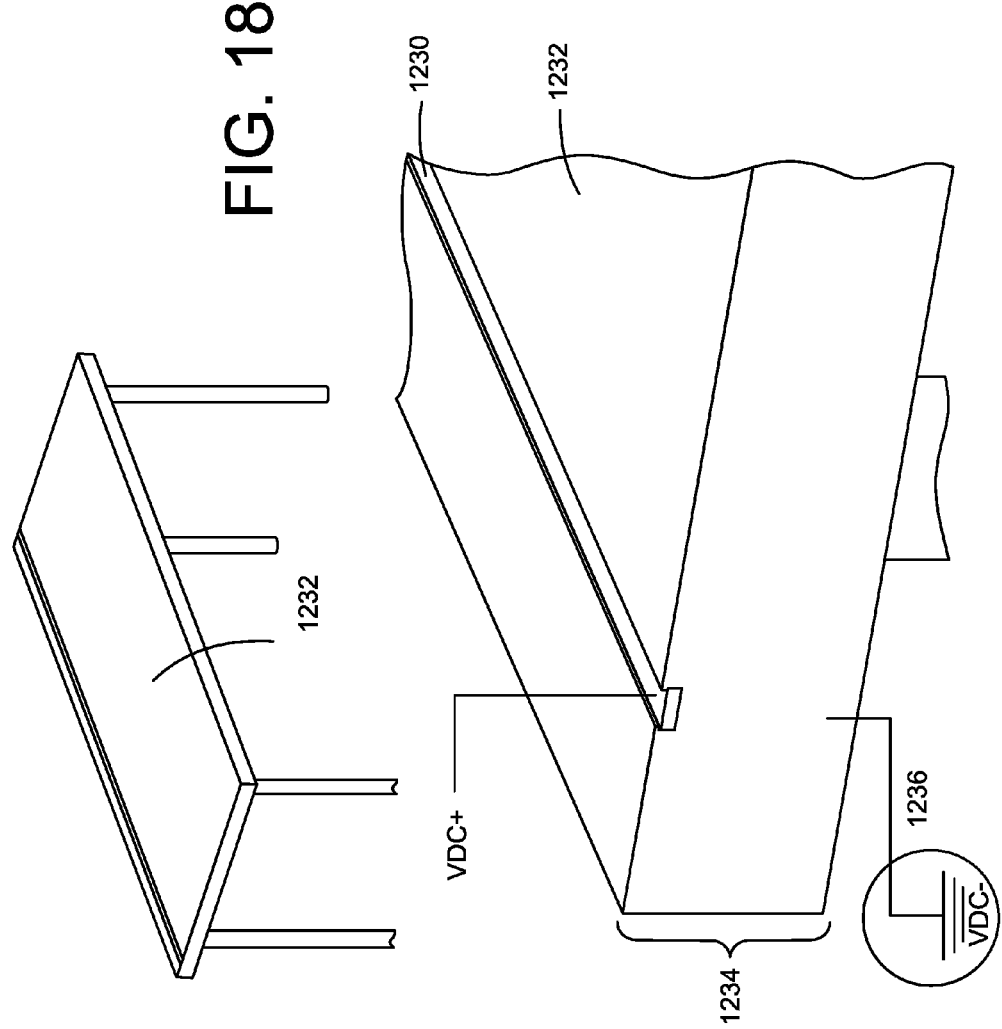
FIG. 18 depicts an example of a single conductive buss incorporated into a desk office furniture component in which the return (ground) circuit is a conductive portion of the desk office furniture component.

By way of example, as shown in FIG. 18, a single conductive buss 1230 is incorporated directly into a top surface 1232 of a desk office furniture component 1234. The desk office furniture component 1234 operates as the return (ground) circuit 1236 necessary for low voltage DC to flow through the single conductive buss 1230. The desk office furniture component 1232 must be manufactured from a sufficiently conductive material to permit electricity to flow from the single conductive buss 1230 through the desk office furniture component 1232. The example single conductive buss 1230 can be incorporated into other portions of the desk office furniture component 1232, e.g., the desk's legs or edges, or into other types of office furniture components, e.g., cabinets, book shelves, credenzas, etc.

Figure 19:
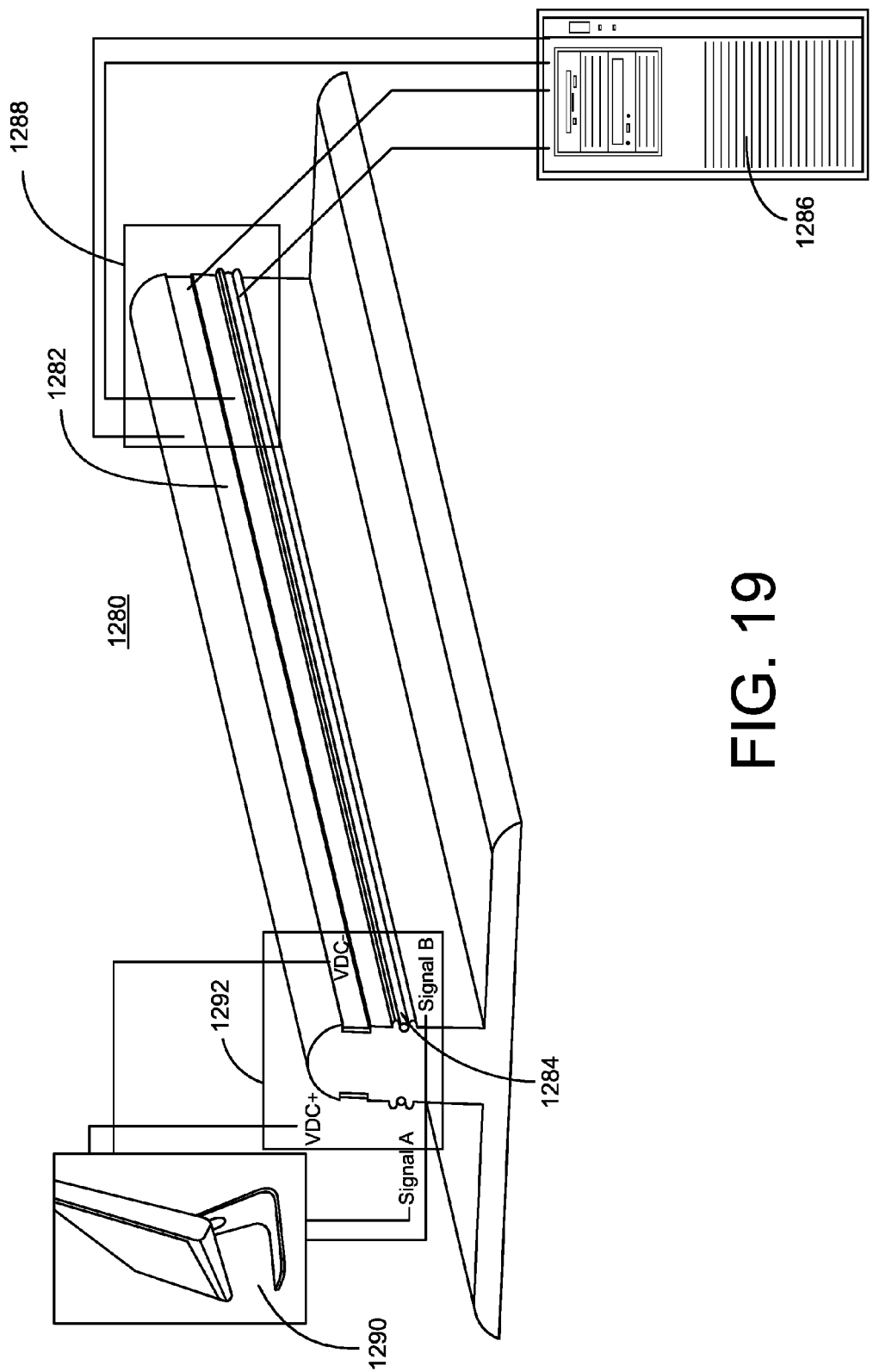
FIG. 19 depicts an example buss system comprised of an electrical buss and an integrated communication buss.

FIG. 19 illustrates an example buss system 1280 having both an electrical buss 1282 and a communication buss 1284. The communication buss 1284 may comprise communication, networking, PSTN, VOIP, Internet, ethernet, telephone, serial, USB, or any other type of communication buss known in the art. A control device 1286 is attached to the electrical buss 1282 and the communication buss 1284 at a first region 1288 of the buss system 1280. A peripheral device 1290 is attached to the electrical buss 1282 and the communication buss 1284 at a second region 1292 of the buss system 1280. The electrical buss 1282 and the communication buss 1284 allow the control device 1286, e.g., a computer, to communicate with the peripheral device 1290, e.g., a computer monitor, even if the peripheral device 1290 is in a location remote from the control device 1286.

FIG. 20 illustrates a buss system 1350 with an engineered cross section shape 1352. The engineered cross section shape 1352 may take any geometric configuration, including, for example, a rectangular cross section, that is compatible with the geometry of those load connectors needed to tap into the low voltage DC (or other suitable signal) flowing through the engineered cross section shape 1352.

Figure 21:
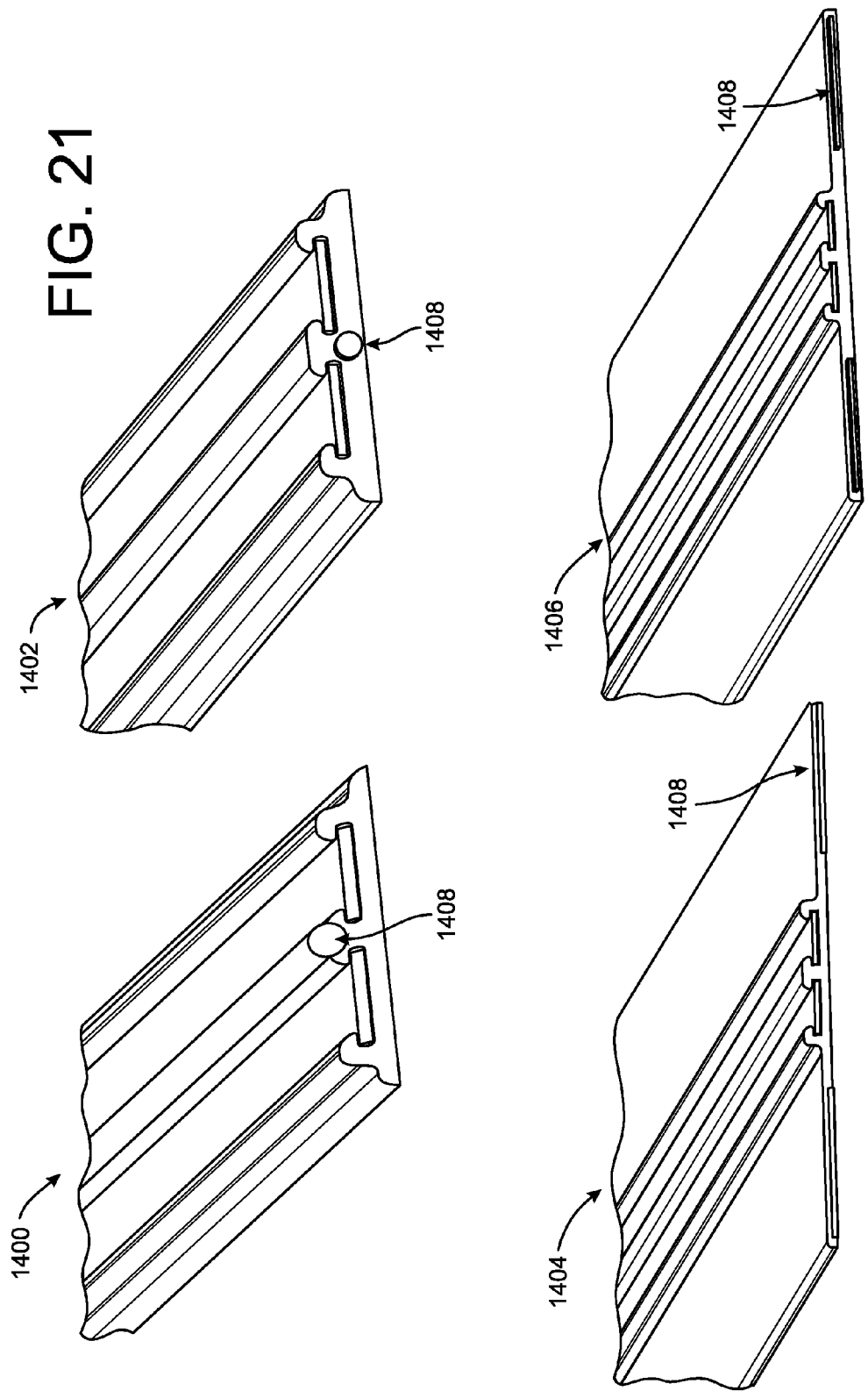
FIG. 21 depicts various example conductive buss cross sections with magnetic material used to form a bond with a device or fixture.

While there are many benefits to buss systems with particular cross sections, there are likewise many benefits of buss systems formed of particular materials. For example, FIG. 21 illustrates four example buss systems 1400, 1402, 1404, 1406 that include ferrous metal wire 1408. In some examples, the ferrous metal wire 1408 allows for a device to be magnetically attached to one of the buss systems 1400, 1402, 1404, 1406. Thus, in such examples, devices may be electrically and mechanically coupled to the buss systems 1400, 1402, 1404, 1406 in one step. In still other examples, though, devices may be secured to buss systems using gravity alone.

Figure 22:
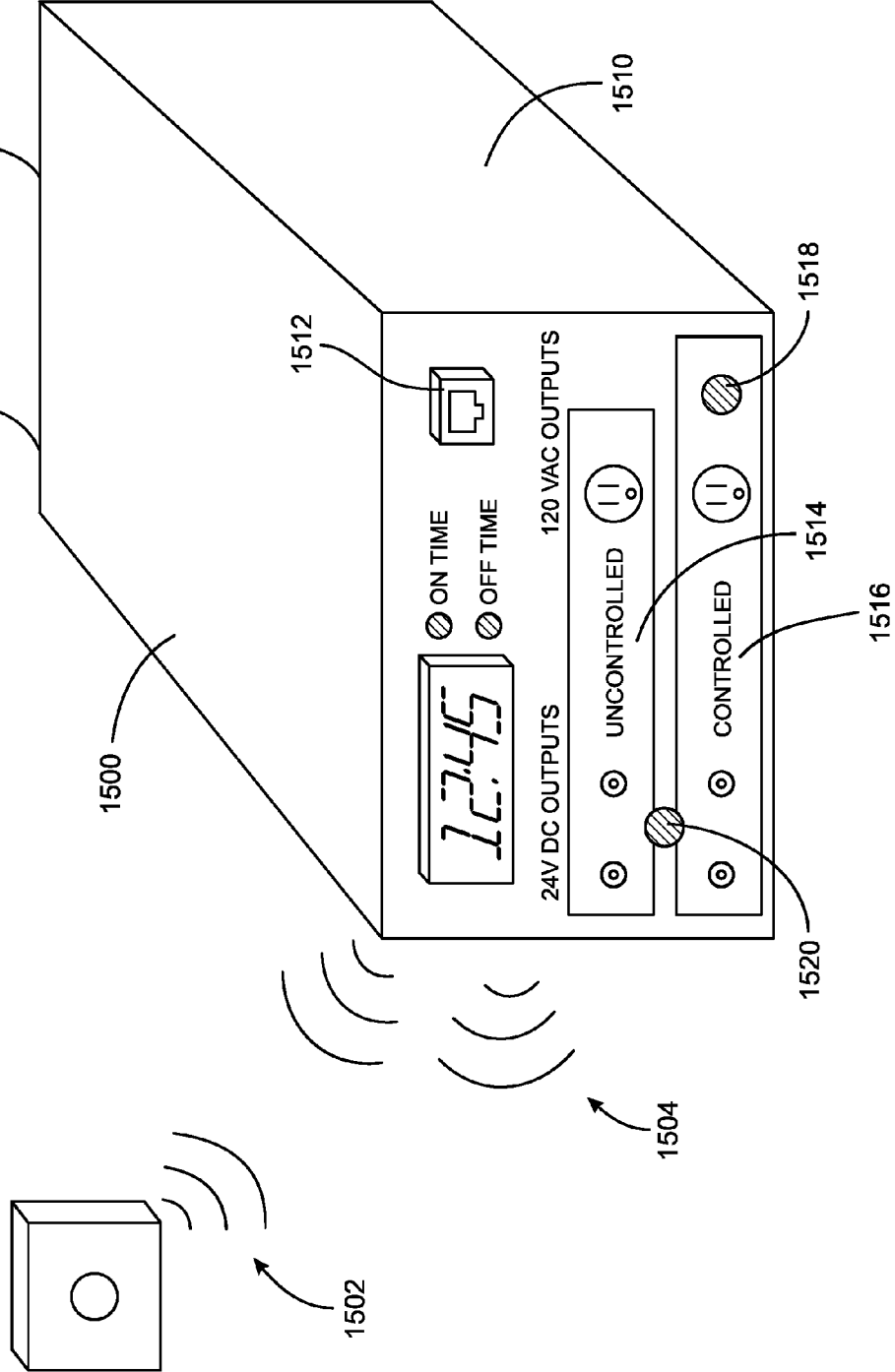
FIG. 22 depicts an example office furniture power supply for use with the example buss systems disclosed herein.

Further, FIG. 22 illustrates an example office furniture power supply 1500. In some examples, the office furniture power supply 1500 replaces and/or otherwise supplements the transformer "bricks" that provide low voltage DC power to the many products that utilize rechargeable batteries, e.g., laptops, cellular telephones, smart phones, etc., commonly found in the office environment. As noted elsewhere, these transformer "bricks" that convert the AC voltage exiting electrical outlets to the DC voltage necessary to power such devices oftentimes waste energy during the conversion process. The example office furniture power supply 1500 reduces the amount of wasted energy. The example office furniture power supply 1500 supplies power to any of the example conductive buss systems disclosed herein.

For instance, the example office furniture power supply 1500 reduces power consumption by communicating with one or more sensors 1502. The example office furniture power supply 1500 communicates with the one or more sensors 1502 wirelessly or via any other suitable communication protocol. In particular, in one example, the one or more sensors 1502 are light sensors that communicate information relating to the intensity of the ambient light to the office furniture power supply 1500 to reduce or even cut power to office lighting during sunny days, etc. In still other examples, the one or more sensors 1502 may be a motion and/or other suitable sensor that communicates the absence of a person in the proximate environment to the office furniture power supply 1500 to de-energize the electrical buss when the one or more sensors 1502 do not detect the presence of an occupant, for example, during an employee's lunch break, overnight, etc. In yet other examples, the one or more sensors 1502 may be any other suitable type of sensor that communicates information to the office furniture power supply 1500.

The example office furniture power supply 1500 receives power through one or more inputs 1508. The one or more inputs 1508 may receive AC power, DC power or both as desired. By way of example only, the one or more inputs 1508 receive 120 volt AC power, 230 volt AC power, and/or 380 volt DC power.

The example office furniture power supply 1500 also contains a gateway 1510 to communicate with a building management system and/or other office furniture power supplies. In particular, the example gateway 1510 permits the office furniture power supply 1500 to communicate with the building management system and/or other office furniture power supplies by any suitable communication protocol, e.g., wired, wireless, etc. To allow for wired communication with a BMS, a PC, or other device, the example office furniture power supply 1500 may include a data port 1512. The inventors further contemplate that the gateway may utilize any other suitable communication protocol to communicate with the building management system. It will be appreciated by one of ordinary skill in the art that the building management system may, among other things, control an entire building's power consumption settings.

To provide local control of the office furniture power supply 1500, the example office furniture power supply 1500 communicates with a device 1504, e.g., a personal computer, smart phone, tablet, control device, etc. The device 1504 may be any suitable device that can communicate with, control, and/or provide instructions to the office furniture power supply 1500. As will be understood, the office furniture power supply 1500 may communicate with the device 1504 wirelessly or via any other suitable communication protocol.

To prevent unexpected power loss, the example office furniture power supply 1500 includes a battery backup 1506. In the illustrated example, the battery backup 1506 provides 24 volt DC power and is integrated into the office furniture power supply 1500. Alternatively, the battery backup 1506 may be a peripheral device that is not integrated into the office furniture power supply 1500.

To accommodate a variety of office space environment power requirements, the office furniture power supply 1500 comprises both uncontrolled outputs 1514 and controlled outputs 1516. The uncontrolled outputs 1514 may be used to power devices that are never turned off, while the controlled outputs 1516 are more suitable to power devices that have less consistent energy usage requirements. The uncontrolled outputs 1514 and the controlled outputs 1516 may output AC and/or DC power as desired.

To prevent power loss to certain devices, including, for example, a conductive buss, the office furniture power supply 1500 includes a manual override switch 1518. For example, as previously noted, the office furniture power supply 1500 may cut power to the conductive buss at a certain time each day, during peak usage times, etc. If, however, an employee continues to work after this time or otherwise requires power, he or she can manually override the office furniture power supply 1500 using the manual override switch 1518 to permit continued use of the conductive buss, and the devices attached to the conductive buss "after hours," during peak usage times, etc.

In the event that the low voltage DC current exceeds a pre-determined safety level, e.g., Class 2 current (amperage) safety requirements, the example office furniture power supply 1500 includes a reset switch 1520 that cuts power from the office furniture power supply 1500. For example, the reset switch 1520 may cut power from the office furniture power supply 1500 if too many items are drawing power from a single conductive buss at the same time. It is further contemplated that the reset switch 1520 might cut power from the office furniture power supply 1500 for other (safety) reasons.

Figure 23:
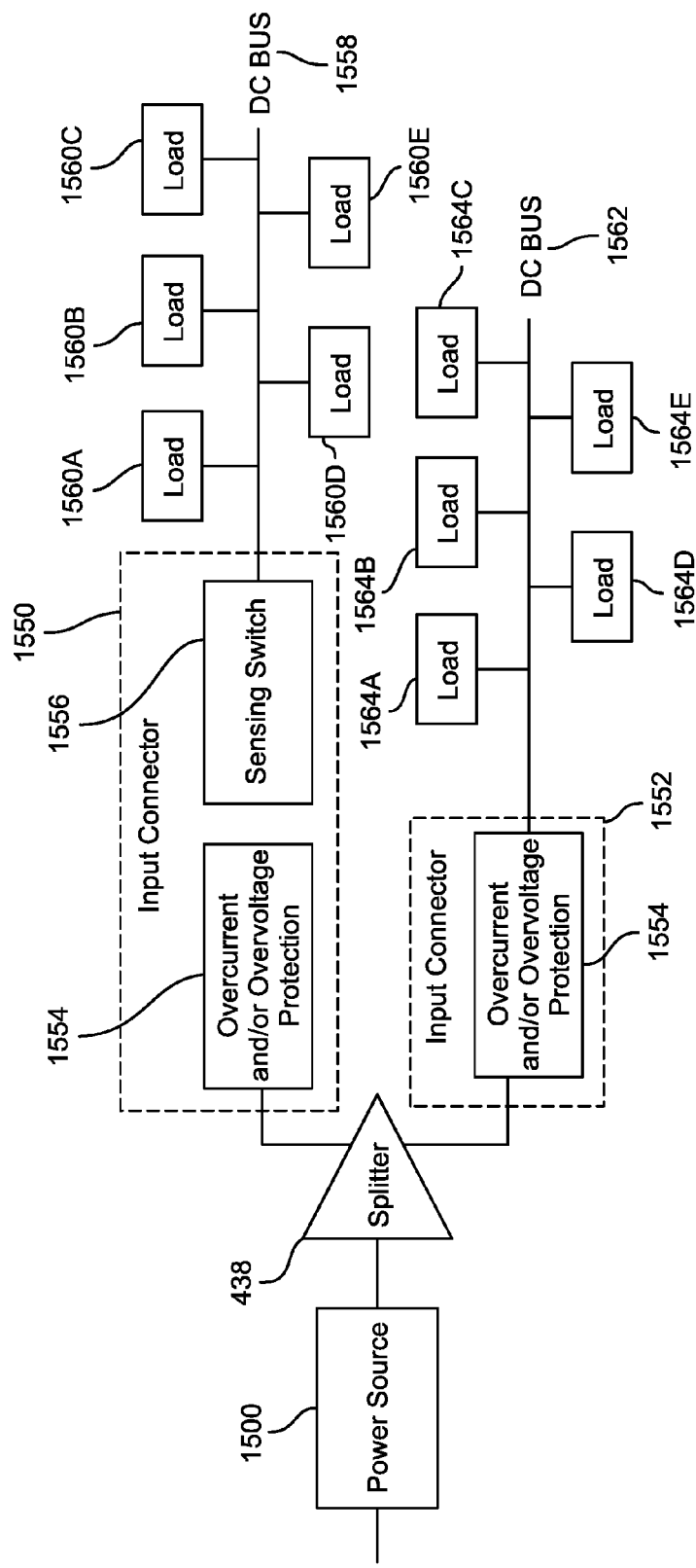
FIG. 23 depicts an example conductive buss system wherein at least one connector includes a sensor or a sensor switch and a mechanism for protecting against overcurrent and/or overvoltage.

While the office furniture power supply 1500 has been disclosed as having the functionality to limit or cut power for safety or other reasons, the present disclosure contemplates example connectors 1550, 1552 as shown in FIG. 23 that include a mechanism 1554 for protecting against conditions involving overvoltage and/or overcurrent. This mechanism 1554 may be in addition or in the alternative to the functionality of the office furniture power supply 1500. The mechanism 1554 for protecting against overcurrent and/or overvoltage may in some examples operate similar to a fuse, although those having ordinary skill in the art will understand that there a number of ways in which to perform this function. The mechanism 1554 protects against a number of situations, such as, for example, preventing damage or injury to equipment and/or individuals if someone connects an improper power source. In some examples, the connector 1550 includes a sensing switch 1556 in addition to the mechanism 1554 for protecting against overcurrent and/or overvoltage. The sensing switch 1556 may in some examples be associated with a sensor that acts as a further control (e.g., in addition to the power supply 1500, the splitter 438, the mechanism 1554, etc.) as to power delivered to a buss 1558 supporting devices 1560A-E requiring a load. In other examples, however, the connector 1552 does not include a sensing switch in addition to the mechanism 1554 for protecting against overvoltage and overcurrent. As such, the power supply 1500, the splitter 438, and/or the mechanism 1554 operate to control the power supplied to a buss 1562 supporting devices 1564A-E requiring a load.

Figure 24:
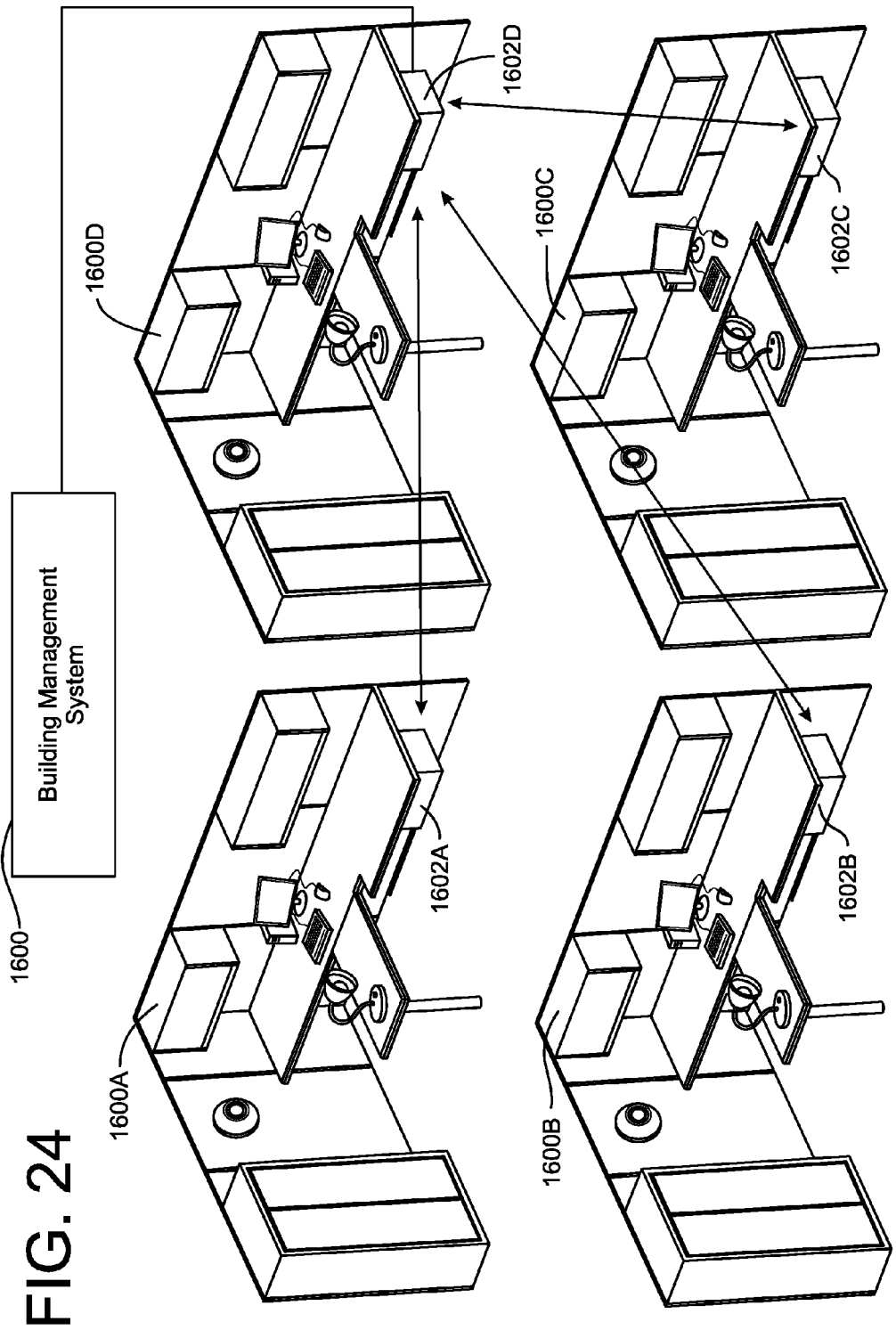
FIG. 24 depicts an illustrative series of office space environments, each of which incorporating the example power supply of FIG. 22 and communicating via a gateway to an example building management system.

FIG. 24 illustrates a series of office spaces 1600. The office spaces 1600A-D comprising the series of office spaces 1600 each incorporate an office furniture power supply 1602. The office furniture power supplies 1602 communicate to one another via a wired and/or wireless connection. As previously described, to communicate with a building management system 1604 and/or other the office furniture power supplies 1600A-C, at least one of the office furniture power supplies 1602D includes a gateway.

Figure 25:
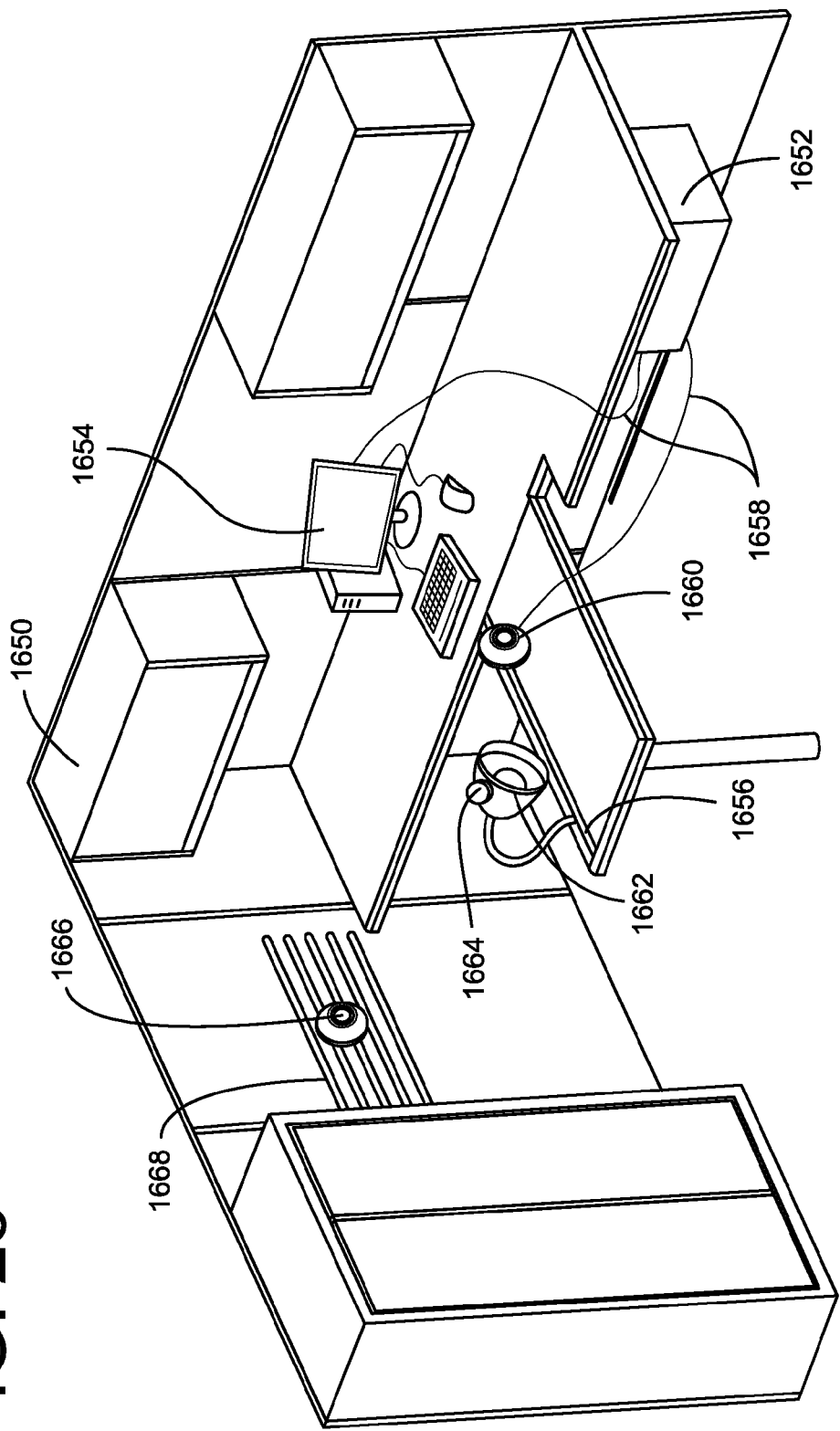
FIG. 25 depicts an example office space environment that incorporates the example office furniture power supply of FIG. 22.

FIG. 25 illustrates an office space environment 1650 that incorporates an office furniture power supply 1652 such as the office furniture power supply 1500. In this example, the office furniture power supply 1652 provides power to a personal computer 1654, a conductive buss 1656, and/or other device(s) as desired. The office furniture power supply 1652 may provide power to devices via one or more wires 1658, which, in turn, may provide power to the conductive bus 1656 via, for example, a connector 1660. The connector 1660 has a sensor that de-energizes the conductive buss 1656 when activated. The sensor may be any suitable type of sensor, including, for example, a motion sensor. The example office space environment 1650 also contains a task light 1662. The task light 1662 incorporates a daylight sensor 1664 that communicates with the task light 1662 to adjust its light output based on the ambient light in the office space environment 1650.

The example office space environment 1650 also includes a wireless occupancy sensor 1666 connected to and drawing power from an independent conductive buss 1668. The wireless occupancy sensor can communicate with the office furniture power supply 1652 to control the power output to the conductive buss 1656. In this way, when no motion is detected by the wireless occupancy sensor 1666, the office furniture power supply 1652 does not provide power to the conductive buss 1656, thereby reducing the power consumption in the office space environment 1650.

FIGS. 26-33 illustrate a variety of example devices that can be electrically and mechanically coupled to conductive busses such as the example conductive busses disclosed herein. With respect to FIGS. 26A-C, numerous example edge-lit luminaires 1700, 1702, 1704 are shown. Perspective views are shown in FIG. 26A, perspective front views are shown in FIG. 26B, and schematic side views are shown in FIG. 26C. Each of the edge-lit luminaires 1700, 1702, 1704 is shown to be mechanically and electrically coupled to a conductive bus 1706, which can occur in a single step as disclosed above. In some examples, light sources near the conductive buss 1706 for the edge-lit luminaires 1700, 1702, 1704 are LEDs. Light guides, which have rectangular cross sections and/or are transparent in some examples, may direct light away from the light source to an optical means that directs the light towards a surface.

In one example, for instance, the edge-lit luminaire 1700 includes a light guide 1708 and optical means (not shown) that emit light 1710 from two opposing surfaces. In another example, the edge-lit luminaire 1702 includes a light guide 1712 and optical means (not shown) that emit light 1710 from one surface, which is downwards in the example shown in FIG. 26C. Also, in another example, the edge-lit luminaire 1704 includes a light guide 1714 and optical means (not shown) that emit light from an edge of the panel towards a mounting surface. In one example, the light guide 1714 may be bent between 135 and nearly 180 degrees to direct light out of an edge or a side of the light guide 1714. Alternatively, light guides may be shaped reflectors that receive light exiting the light source and direct it towards a mounting surface. In each of these examples, the conductive bus 1706 may be supported by a base 1716 affixed, for instance, to a piece of office furniture.

FIGS. 27A-C illustrate another example device in the form of an edge-lit partition 1750 having a light guided panel 1752, a reflector hood 1754, a strip LED printed circuit board (PCB) 1756, and at least one connector 1758 for coupling the edge-lit partition 1750 to a conductive buss 1760. As shown in FIG. 27B, the reflector hood 1754 reflects light 1710 emitted from a top of the light guided panel 1752 downwards.

FIGS. 28A-D provide various perspective views of still another example device that can be used with the example conductive busses disclosed herein, namely, a floor lamp 1800. In one example, the example floor lamp 1800 includes a base 1802, a power input 1804, a light guide panel and/or support 1806, and a reflector hood 1808. In one example, the example floor lamp 1800 may include a strip LED PCB 1810 electrically coupled to the power input 1804. The power input 1804 may be selectively or permanently coupled to a power supply.

In still another example shown in FIGS. 29A-C, another example floor lamp 1850 can be used with the conductive busses disclosed herein. The example floor lamp 1850 generally includes a support or light guide 1852, a base 1854, a reflector hood 1856, and a light source 1858. In some instances, the light guide 1852 may emit light, while in other instances the light guide 1852 routes light through the support to the reflector hood 1856. In some examples, the reflector hood 1856 emits a portion of the light upwards, but reflects a majority of the light downwards.

FIGS. 30A-C illustrate another example device in the form of an example desktop task light 1900 having a light guided panel 1902, a base 1904, a reflector hood 1906, a power input 1908, and a strip LED PCB 1910. In one example, the reflector hood 1906 may be generally horizontal, or bent roughly 90 degrees from a main portion of the light guided panel 1902, and contain integrally formed prismatic reflective elements so as to direct the light towards sides of the reflector hood 1906 and light guided panel 1902 in addition to downwards towards a desk or other surface.

With respect now to FIGS. 31A-B, an example luminaire 1950 is shown to include a rectangular light guide 1952, a strip LED PCB light source 1954, and two connectors 1956 that are electrically and mechanically coupled to a conductive buss 1958. As shown, the light 1710 is emitted from the rectangular light guide 1952 as well as a reflector hood 1960 disposed towards or at a top of the rectangular light guide 1952. The rectangular light guide 1952 can serve a variety of roles such as a whiteboard, as a light source, as accent lighting, and as a privacy screen, for example.

Yet another example luminaire 2000 is shown in FIGS. 32A-C. In this example, the example luminaire 2000 is LED-based and may be selectively affixed to a buss strip 2002. One purely example location in which such a configuration would be advantageous is underneath a cabinet. The buss strip 2002 may include ferrous metal strips 2004 applied to a back surface of the buss strip 2002 in addition to an electrical power buss 2006. The luminaire 2000 may likewise include magnetic elements such that the luminaire 2000 may be magnetically attached to the buss strip 2002, which may be mounted to an underside of a cabinet, table, or other piece of office equipment.

Furthermore, FIGS. 33A-C show another example luminaire 2020 similar to the example luminaire 2000. The example luminaire 2020 in FIGS. 33A-C, which may have a magnetic light base 2024, may be attached to a buss strip 2022 underneath a table, cabinet, etc. The example buss strip 2022 includes a ferrous metal wire 2026 for magnetic attachment as well as an electrical power buss 2028. One difference between the buss strip 2022 and the buss strip 2002 is that the buss strip 2022 uses a magnetized wire, namely the ferrous metal wire 2026, to form a magnetic attraction with the example luminaire 2020, whereas the buss strip 2002 uses ferrous metal strips 2004 to form a magnetic attraction. As one having ordinary skill will understand, a multitude of configurations in which to leverage magnetic elements are possible.

Figure 34:
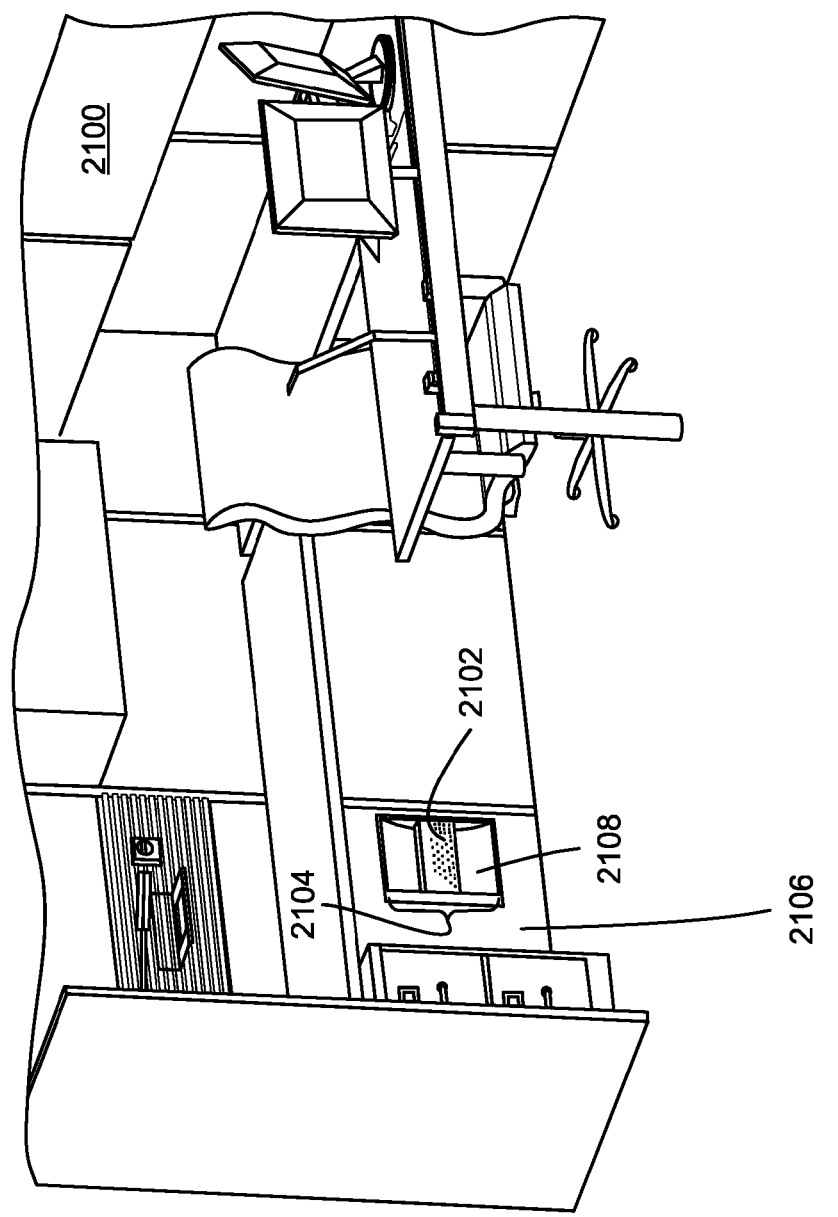
FIG. 34 depicts an example office space environment that houses a power source within a cavity of an office furniture component.

FIG. 34 illustrates an office space environment 2100 that incorporates an office furniture power source 2102 such as the office furniture power source 1500. In this example, the office furniture power source 2102 is housed within a cavity 2104 of an office furniture component 2106. In some examples, the cavity 2104 has ducting 2108 that permits the convection of air through the office furniture power source 2102. In still other examples, an office furniture power source may be attached directly to a metallic frame of an office furniture component, wherein the frame may provide conductive cooling. In yet other examples, the power source, in addition to providing power used to power a device, may also charge a battery backup to permit continued use of the device in the event of a short-term power outage.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A power delivery buss system, comprising:
    a power source that provides a direct current (DC) output;
    a buss comprising an electrically insulated carrier, a pair of electrically conductive rails mounted to the electrically insulated carrier and exposed on a surface of the electrically insulated carrier, and a ferromagnetic rail associated with the electrically insulated carrier, wherein the pair of electrically conductive rails and the ferromagnetic rail run parallel to each other along a length of the electrically insulated carrier, wherein the ferromagnetic rail is disposed equidistantly between the pair of electrically conductive rails with at least a portion of the electrically insulated carrier being disposed between each of the pair of electrically conductive rails and the ferromagnetic rail, and wherein at least one of the pair of electrically conductive rails is electrically coupled to the power source; and
    a load connector for providing DC power from the buss to a device coupled to the load connector, the load connector having a pair of electrical contacts arranged to connect to the pair of exposed, electrically conductive rails to provide a DC power connection with the buss and a magnetic that is arranged to cooperate with the ferromagnetic rail to provide a magnetic connection with the buss wherein the magnetic connection allows the load connector to be moved along a length of the pair of exposed, electrically conductive rails while maintaining the DC power connection.

2. The power delivery buss system as recited in claim 1, wherein the ferromagnetic rail is exposed on the surface of the electrically insulated carrier.

3. The power delivery buss system as recited in claim 1, wherein the ferromagnetic rail is embedded within the electrically insulated carrier.

* * * * *